(12) United States Patent
Zhu et al.

(10) Patent No.: US 10,637,245 B2
(45) Date of Patent: Apr. 28, 2020

(54) SYSTEM AND METHOD FOR SIZING A CAPACITY OF AN ENERGY STORAGE DEVICE

(71) Applicants: TOTAL S.A., Courbevoie (FR); NORTH CAROLINA STATE UNIVERSITY, Raleigh, NC (US)

(72) Inventors: Xiangqi Zhu, Raleigh, NC (US); Wente Zeng, Cary, NC (US); Jiahong Yan, Raleigh, NC (US); Ning Lu, Cary, NC (US)

(73) Assignees: TOTAL S.A., Courbevoie (FR); NORTH CAROLINA STATE UNIVERSITY, Raleigh, NC (US)

( * ) Notice: Subject to any disclaimer, the term of this patent is extended or adjusted under 35 U.S.C. 154(b) by 104 days.

(21) Appl. No.: 15/612,596

(22) Filed: Jun. 2, 2017

(65) Prior Publication Data

US 2018/0351362 A1 Dec. 6, 2018

(51) Int. Cl.
*H02J 3/32* (2006.01)
*H02J 3/38* (2006.01)
*H02J 3/14* (2006.01)
*H02J 3/00* (2006.01)

(52) U.S. Cl.
CPC ........ *H02J 3/32* (2013.01); *H02J 3/14* (2013.01); *H02J 3/382* (2013.01); *H02J 3/383* (2013.01); *H02J 2003/003* (2013.01)

(58) Field of Classification Search
None
See application file for complete search history.

(56) References Cited

U.S. PATENT DOCUMENTS

2008/0114499 A1* 5/2008 Hakim ............... G06Q 50/06
                                                       700/291
2010/0133903 A1* 6/2010 Rufer .................. F02C 6/16
                                                       307/22

* cited by examiner

*Primary Examiner* — Jue Zhang
*Assistant Examiner* — Henry E Lee, III
(74) *Attorney, Agent, or Firm* — Oblon, McClelland, Maier & Neustadt, L.L.P.

(57) ABSTRACT

A method and system for sizing energy storage device capacity. The method includes generating a load profile of at least an entity based on at least information acquired by a user interface, generating an ensemble of net load profiles based on at least the load profile and based on at least one energy source profile, determining values of cumulative distribution functions associated with a plurality of energy storage device capacities as a function of at least the ensemble of net load profiles, generating a graphical representation of a combination of the composite cumulative distribution functions and a cluster of equal probability line, rendering the graphical representation, and sizing a capacity of the energy storage device based on the rendered graphical representation.

16 Claims, 25 Drawing Sheets

SYSTEM AND METHOD FOR SIZING A CAPACITY OF AN ENERGY STORAGE DEVICE

BACKGROUND

The total installed capacity for solar photovoltaics (PVs) has been increasing dramatically in the past few years because of price drop, government subsidies, as well as increased consumer awareness of environmental issues. Rapid power and voltage fluctuations along distribution feeders caused by behind-meter PVs have created serious operational issues such as overvoltage, reverse power flow, flickers, and equipment overloading. Energy storage devices (ESDs) can store energy for future use, smooth out large power fluctuations, and provide reactive power support to stabilize system voltage, making them one of the most effective technical solutions for the aforementioned operational issues. However, ESDs are expensive. Comprehensive cost-benefit studies have shown that the following strategies may make using ESDs more cost-effective: 1) providing multiple services to increase the utilization rate and revenue streams, 2) using demand-side management (DSM) to reduce the size of ESDs, and 3) sharing ESDs among a group of users to reduce the amount of ESD needed at the aggregated level.

Previous studies on sizing ESDs based on technical requirements focused mainly on smoothing power outputs of large solar or wind farms as described in P. Denhol, E. Ela, B. Kirby, and M. Milligan, the role of energy storage with renewable electricity generation, vols. NREL/TP-6A2-47187, January 2010. ESDs sizing studies at the residential level have not been fully investigated. Also, the previous studies only use worst case or average case to do the sizing study.

At residential households, communities, and feeders, level-sizing considerations may vary according to the ownership, location, and service requirements of an energy storage system. For example, an ESD on a residential feeder can be owned by: 1) a homeowner for supporting the rooftop PV system, 2) a utility for power quality and reliability considerations, or 3) a third-party aggregator for providing grid services. A home-owned ESD is behind-the-meter for balancing the home's own consumption needs. A utility-owned ESD may be placed close to a transformer or provides feeder-level services that impact all users on the feeder. Third party-owned ESDs may be placed on separate sites or even on mobile trucks for providing services to whoever needs them.

Another technical challenge for the residential ESD sizing study is the modeling of residential load consumptions. A typically approach is to use hourly average- or worst-case load profile derived from historical data for sizing ESDs. A major disadvantage of the approach is that it cannot account for the load pattern shift caused by behavioral changes of residential customers after the PV is installed. In addition, because both the PV generation and residential load consumptions are highly intermittent, considering a wider range of operation conditions is needed to size an energy storage system so that the performance of the ESDs will meet the requirements within a given risk margin.

Accordingly, what is needed, as recognized by the present inventors, is a method and a system for sizing ESDs for residential households, communities, and feeders.

The foregoing "Background" description is for the purpose of generally presenting the context of the disclosure. Work of the inventors, to the extent it is described in this background section, as well as aspects of the description that may not otherwise qualify as prior art at the time of filing, are neither expressly or impliedly admitted as prior art against the present invention.

SUMMARY

In one aspect, the present disclosure relates to a method for sizing energy storage device capacity. The method includes generating a load profile of at least an entity based on at least information acquired by a user interface, generating, via the processing circuitry, an ensemble of net load profiles based at least on the load profile and based on at least one energy source profile; determining values of cumulative distribution functions associated with a plurality of energy storage device capacities as a function of at least the ensemble of net load profiles, generating, via the processing circuitry, a graphical representation of a combination of the cumulative distribution functions and at least an equal probability line; rendering the graphical representation; and sizing a capacity of the energy storage device based on the rendered graphical representation.

In another aspect, the present disclosure relates to a system for sizing energy storage device capacity. The system includes processing circuitry. The processing circuitry is configured to generate a load profile of at least an entity based on at least information acquired by a user interface, generate an ensemble of net load profiles based at least on the load profile and based on at least one energy source profile, determine values of cumulative distribution functions associated with a plurality of energy storage device capacities as a function of at least the ensemble of net load profiles, generate a graphical representation of a combination of the cumulative distribution functions and at least an equal probability line, render the graphical representation, and size a capacity of the energy storage device based on the rendered graphical representation.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
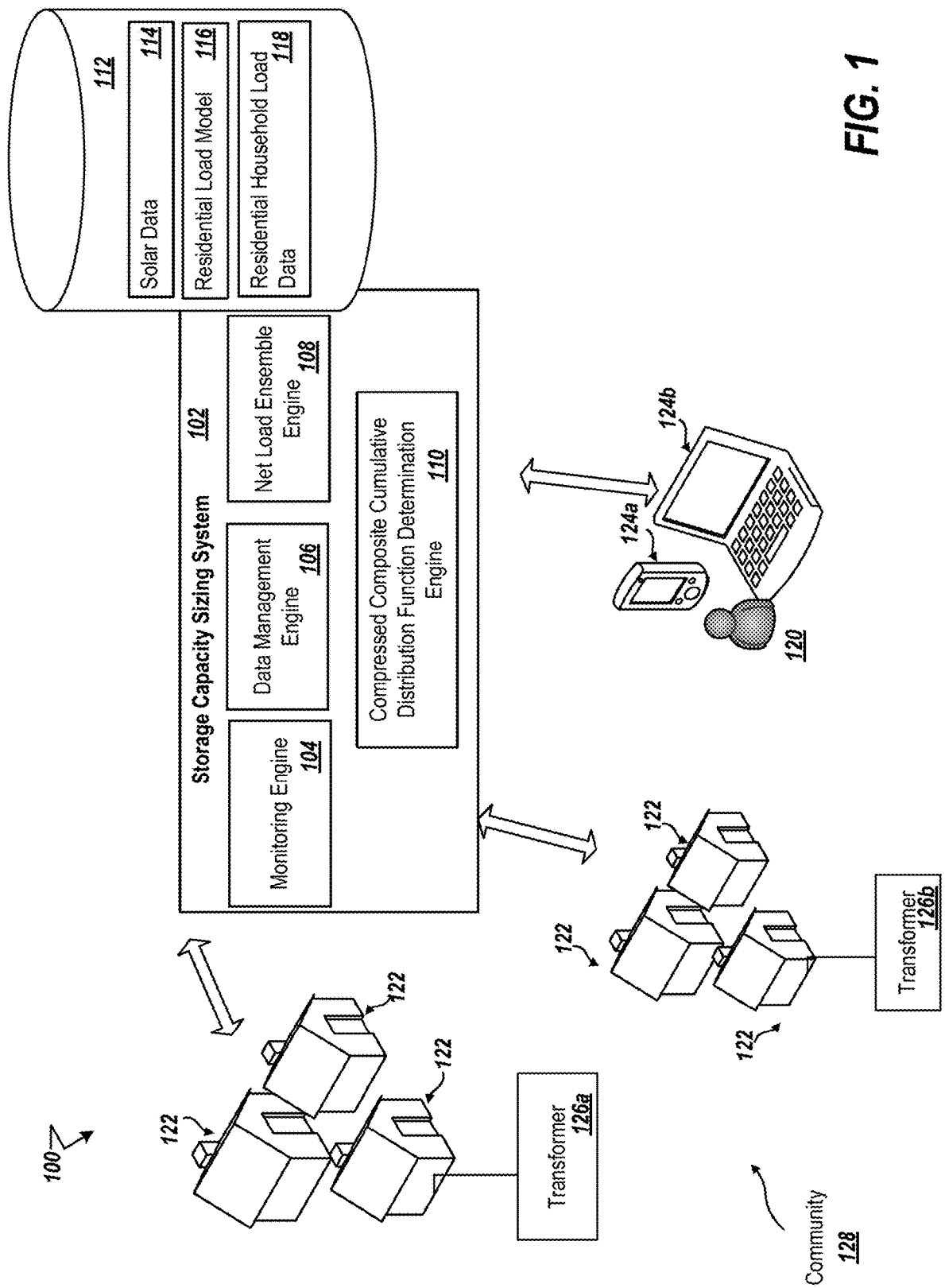
FIG. 1 is an exemplary diagram of an example environment for sizing a capacity of an energy storage device.

Referring now to the drawings, wherein like reference numerals designate identical or corresponding parts throughout several views, the following description relates to a system and associated methodology for sizing an energy storage device (ESD) for power system applications.

The method described herein may be used to size energy storage devices and renewable energy generation system size for residential feeders including multiple levels from single home to the whole community. The ESD stores renewable energy generated by a renewable energy generation system such as solar photovoltaics (PVs). The renewable energy system may include a wind power generation system (e.g., wind mills), a hydraulic energy source, a micro combined heat and power (CHP) unit for heating and electricity generation, or any other energy system from renewable resources such as rain, tides or waves. The energy storage device may be an electrical energy storage device, a fuel cell, a thermal energy storage device, a bioelectrochemical energy storage device, a hybrid energy storage device, or the like. The method may also be applied to size capacity of other electric devices such as the capacity of electrical vehicles under different sizing criteria.

FIG. 1 is an exemplary diagram of an example environment 100 for sizing a capacity of the ESD. A storage capacity sizing system 102 may include a monitoring engine 104, a data management engine 106, a net load generation engine 108, a compressed composite cumulative distribution function (CC-CDF) determination engine 110, and a database 112.

The engines described herein may be implemented as either software and/or hardware modules and may be stored in any type of computer-readable medium or other computer storage device. For example, each of the engines described herein may be implemented in circuitry that is programmable (e.g., microprocessor-based circuits) or dedicated circuits such as application specific integrated circuits (ASICS) or field programmable gate arrays (FPGAS). One or more software instructions in the engines may be embedded in firmware, such as an erasable programmable read-only memory (EPROM).

Figure 25:
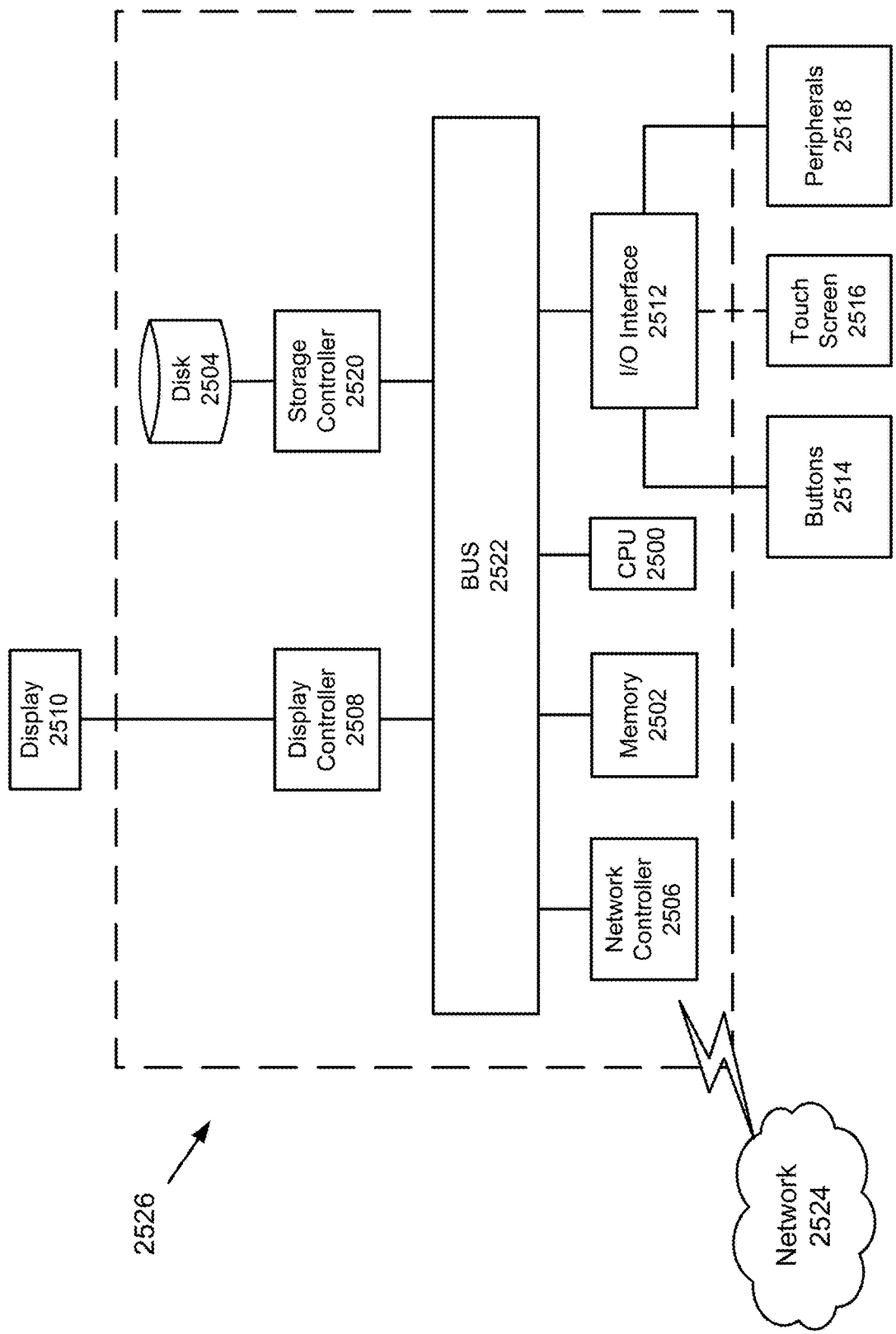
FIG. 25 is an exemplary block diagram of a computer according to one example.

In some implementations, the processes associated with each of the modules may be performed by one or more processors of a server or other computing resources, which can include cloud computing resources. For example, the processes may be performed by a computer 2526 shown in FIG. 25. The computer 2526 may include a CPU 2500 and a memory 2502 as shown in FIG. 25. The CPU 2500 may execute software instructions written in a programming language such as Java, C, or assembly. In one implementation, the database 112 may be implemented in the memory 2502 of the computer 2526.

Referring to FIG. 1, the database 112 stores solar data 114, residential load model 116, and residential household load data 118. The solar data 114 may be historical solar radiation data associated with a location. The residential household load data 118 may include controllable loads and baseloads (i.e., uncontrollable loads). Controllable loads may include temperature sensitive load (TSL) and behavior sensitive load (BSL). The TSL may include space heater, air conditioning, water heater and the like. The BSL may include washer, dryer, and the dishwasher. The baseload profiles may include temperature-insensitive data mainly uncontrollable loads such as include cooking, television, lighting, refrigeration, and the like.

The system 102 may receive from a user 120 via an electronic device 124 that can include mobile devices 124a, computer 124b, or any other type of external computing device, a request to size an ESD associated with a home 122, a community 128, or a transformer 128 (i.e., feeder). For example, the ESDs may be associated with aggregated distributed energy resources systems. The request may include a location associated with the ESD. The system 102 may provide the user with a questionnaire via a user interface to input lifestyle and behavioral data, number of household members, home area size, number of televisions, number and size of air conditioning units, and information associated with other appliances at the home, that are used by the data management engine 106 to determine a residential load model 116 and residential household load profile 118 that estimate the residential load profile of the home. In one implementation, the database 112 may store residential load profiles for different consumer categories (e.g., house size and residential living patterns). The data management engine 106 may determine a consumer category based on the acquired information, then the data management engine 106 retrieves the load profile associated with the determined consumer category from the database 112. The storage capacity sizing system 102 may provide a capacity of the energy storage device associated with the home based on the information uploaded by the user as a response to the questionnaire. The database 112 may also store a capacity for each consumer category. Thus, the storage capacity sizing system 102 may retrieve the capacity of the energy storage device based on the information uploaded by the user which minimizes computation time as the capacity associated with each consumer category may be predetermined and stored in the database 112. In one implementation, the system 102 may compare a peak valley and average load consumption for a day and/or a month to determine the similarity between stored load profiles that may be used to determine a capacity for similar homes.

The user interface may be part of a website, web portal, personal computer application, or mobile device application configured to allow the user 120 to interact with the storage capacity sizing system 102. The user interface is provided with input devices such as a mouse, a tablet, a keyboard and so on, through which users may input commands and data output devices such as a display and so on, through which the system provides users with the CC-CDF curves and the equal probability line (EPL). The users can start up the system 102 through the user interface and obtain the results output by the system 102.

In one implementation, the system 102 may automatically upload (or prompt the user to upload) a residential load profile associated with the home 122. For example, the monitoring engine 104 may monitor for a predetermined time period the load profile of one or more consumer devices (e.g., refrigerator, air conditioning). For example, the monitor engine 104 may connect wirelessly to the one or more consumer devices to acquire data such as an operation status (i.e., on, off).

Further, the data management engine 106 may retrieve a solar profile associated with the location of the home based on the solar data 114 stored in the database 112. The solar data 114 may include statistics associated with the location of the home such as the percentage of sunny days, cloudy days, and partly cloudy days. In addition, the data management engine 106 may update the database 112 when new data is received by users, or by the monitoring engine 104. This can be done in real-time at the time of a user's request or ahead of time to update the information in the database 112.

The net load generation engine 108 generates the ensemble of the net load profiles as described later herein. The ensemble of the net load profile is a function of the home load profile and the solar profile.

The CC-CDF determination engine 110 generates and output the CC-CDF to the electronic device 124. Further, the monitoring engine 104 may continuously monitor the solar profile of the PV and residential load of the home associated with the user. The CC-CDF determination engine 110 may output an updated CC-CDF to the user.

The description herein is provided with reference to the system being located and implemented external to the electronic device 124. However, it is to be understood that the system may alternatively or additionally be implemented within the electronic device 124, where the electronic device 124 may contain hardware similar to that illustrated in FIG. 25, and the databases of the system may correspond to a memory of the electronic device 124. Further, in some embodiments, the system may be implemented as an application that may be downloaded on the electronic device 124.

In one example, the residential load data is collected by Pacific Northwest National Laboratory at Olympia Peninsula (referred to herein as the Olypen data), WA in the GridWise demonstration project. Energy consumptions of 50 residential homes were measured at 15-minutes resolution for a year (April, 2006-March, 2007), so there are 96 data points for a 24-hour period. At Olympia Peninsula, air conditioners (ACs) are operated only occasionally in summer because of the mild weather in the area, thus the cooling loads can be filtered out by clustering load profiles into "AC on" and "AC off" days. Then, disaggregation methods such as described in Lin, Yu-Hsiu, and Men-Shen Tsai, "Development of an Improved Time-Frequency Analysis-Based Nonintrusive Load Monitor for Load Demand Identification," Instrumentation and Measurement, IEEE Transactions on 63.6 (2014): 1470-1483, can be used to obtain the baseload 1 (BL1) profiles that contain temperature-insensitive loads. An exemplary BL1 profile is shown by trace 202 in FIG. 2A.

Figure 2A:
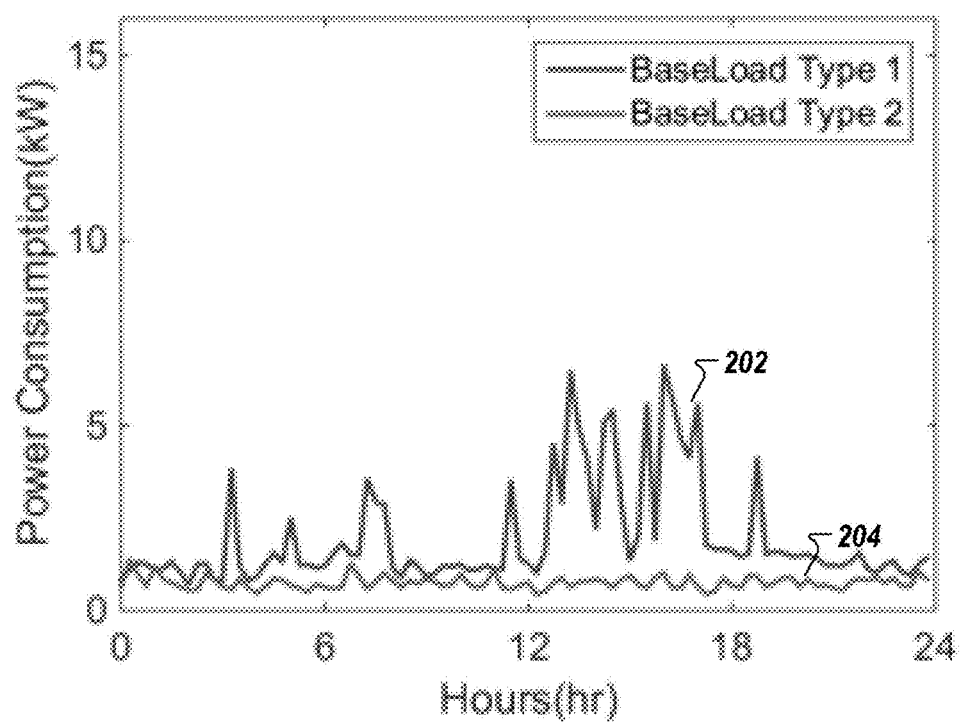
FIG. 2A is a schematic that shows exemplary load profiles for a home.

Similar clustering methods may be used to obtain baseload 2 (BL2) profiles that exclude infrequently-used, controllable residential loads (e.g. washers, dryers, and dishwashers), as shown by trace 204 in FIG. 2A. The BL2 loads are mainly uncontrollable loads such as cooking, lighting, and refrigerating loads. The BL profiles and BL2 profiles may be stored in the database 112. Thus, baseload profiles randomly selected from the BL1 and BL2 profiles, together with the controllable load profiles created by load models, can be used to model residential household loads. The hybrid load profile synthesis process allows the preservation of the correlation between the outdoor temperature and the cooling and heating load consumptions. In addition, the hybrid load profile synthesis process makes it possible for the modelling of the control of load-side resources for reducing the size of the ESD. The residential load profiles are then used to generate the net load ensembles as described later herein.

Figure 2B:
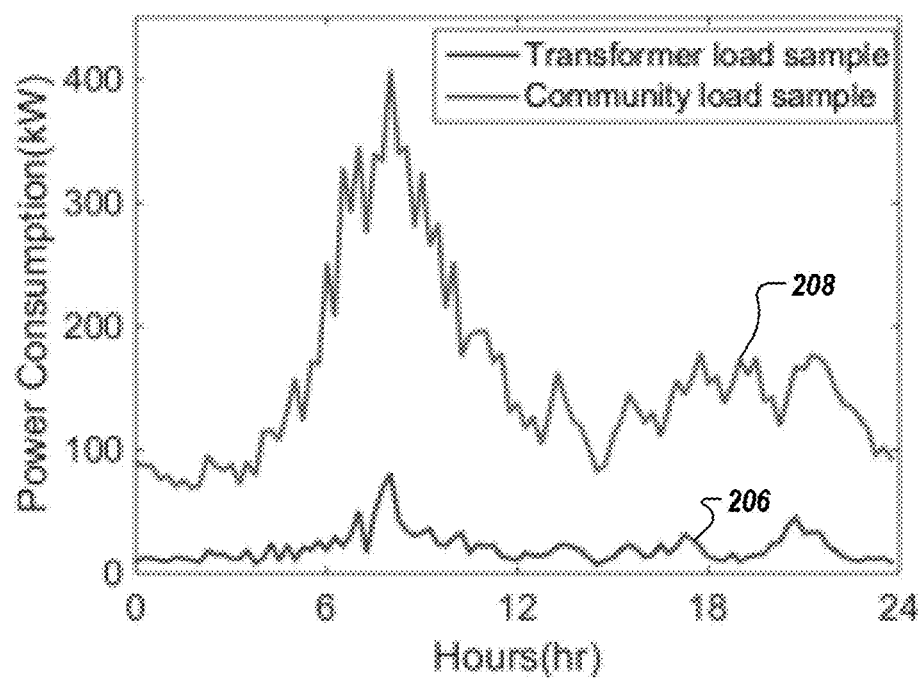
FIG. 2B is a schematic that shows exemplary load profiles.

In one example, a distribution transformer supplies up to 5 residential homes and a community supplies up to 50 homes. Examples of the aggregated load profiles at the transformer- and community-levels are shown in FIG. 2B. Trace 206 shows the aggregated load profile at the transformer level. Trace 208 shows the aggregated load profile at the community level.

Two sets of solar data are used as an example. When studying the seasonal differences, the hourly solar data collected in Olympia Airport and Olypen load data are used. A 5-minute solar radiation data collected from April 2006 to March 2007 in Raleigh, N.C. is also used. To model the temperature impact on loads, temperature sensitive loads are modeled using the temperature data collected in Raleigh in the same time period. The baseloads are extracted from the database 112.

Figure 3:
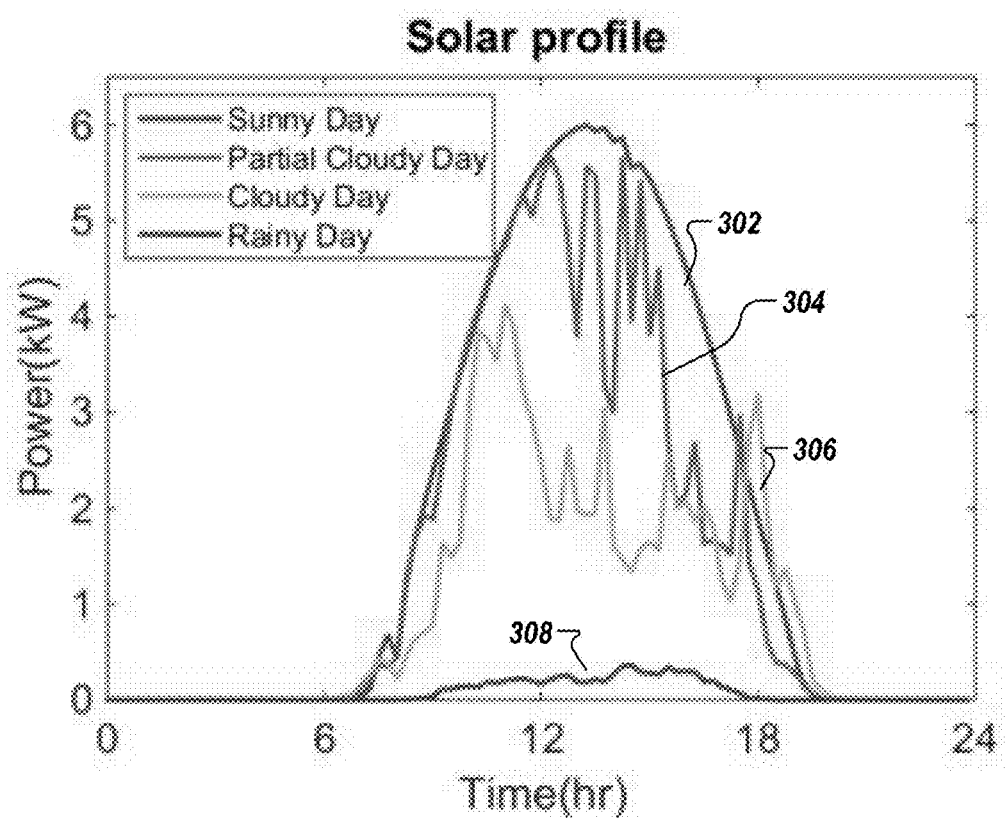
FIG. 3 is a schematic that shows a solar profile according to one example.

The solar radiation data is converted to PV generation profiles with the consideration of conversion efficiency as 20%. A solar output database including four basic solar profiles (sunny, partially cloudy, cloudy, and rainy) was created, as shown in FIG. 3. Trace 302 shows the solar profile for a sunny day, trace 304 shows the solar profile for a partial cloudy day, trace 306 shows the profile for a cloudy day, and trace 308 shows the solar profile for a rainy day.

Figure 4A:
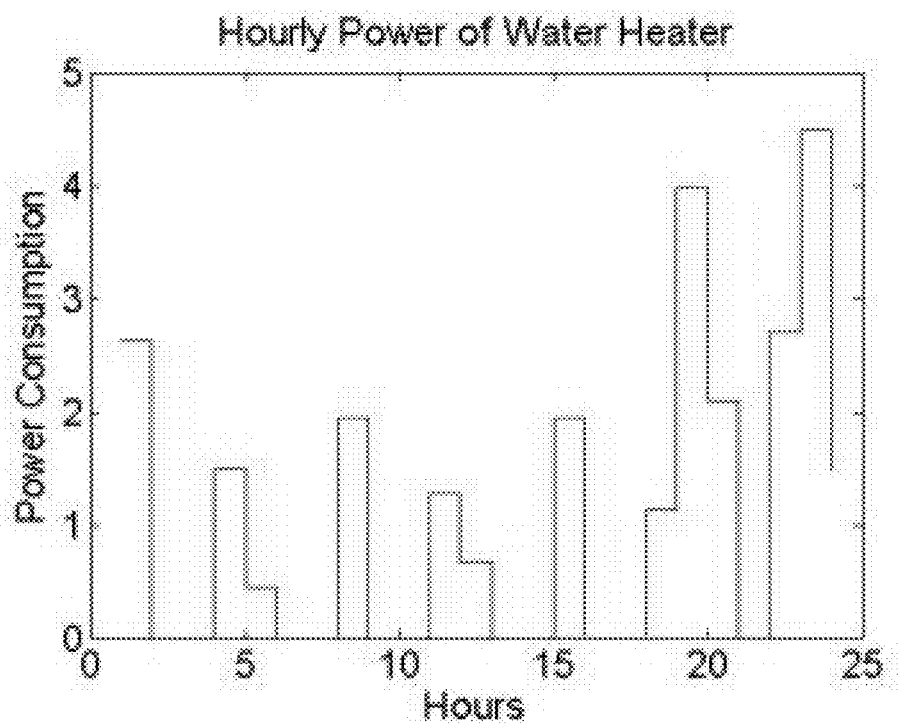
FIG. 4A is a schematic that shows power consumption of a water heater according to one example.
Figure 4B:
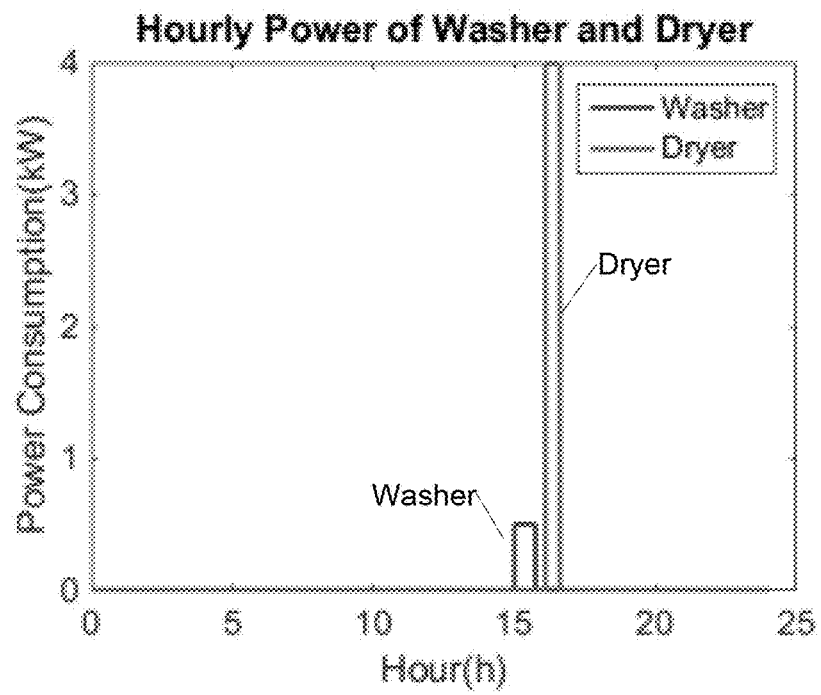
FIG. 4B is a schematic that shows appliance profiles generated using load models according to one example.

To quantify the benefit of managing controllable load resources for reducing the energy storage needs, six controllable appliances are modeled: air-conditioning units (used in summer), space heating units (used in winter), water heaters, dryers, washers, and dishwashers. The load profiles of few controllable appliances are shown in FIGS. 4A and 4B. Controllable appliances are divided into thermostatically-controlled appliances (TCAs) and non-thermostatically controlled appliances (non-TCAs). Air conditioners, space heaters, and water heaters are TCAs. Washers, dryers, and dishwashers are non-TCAs. The residential controllable load models are described in N. Lu, "An evaluation of the HVAC load potential for providing load balancing service", IEEE Trans. Smart Grid, vol. 3, no. 3, pp. 1263-1270, 2012 incorporated herein by reference in its entirety.

Figure 5:
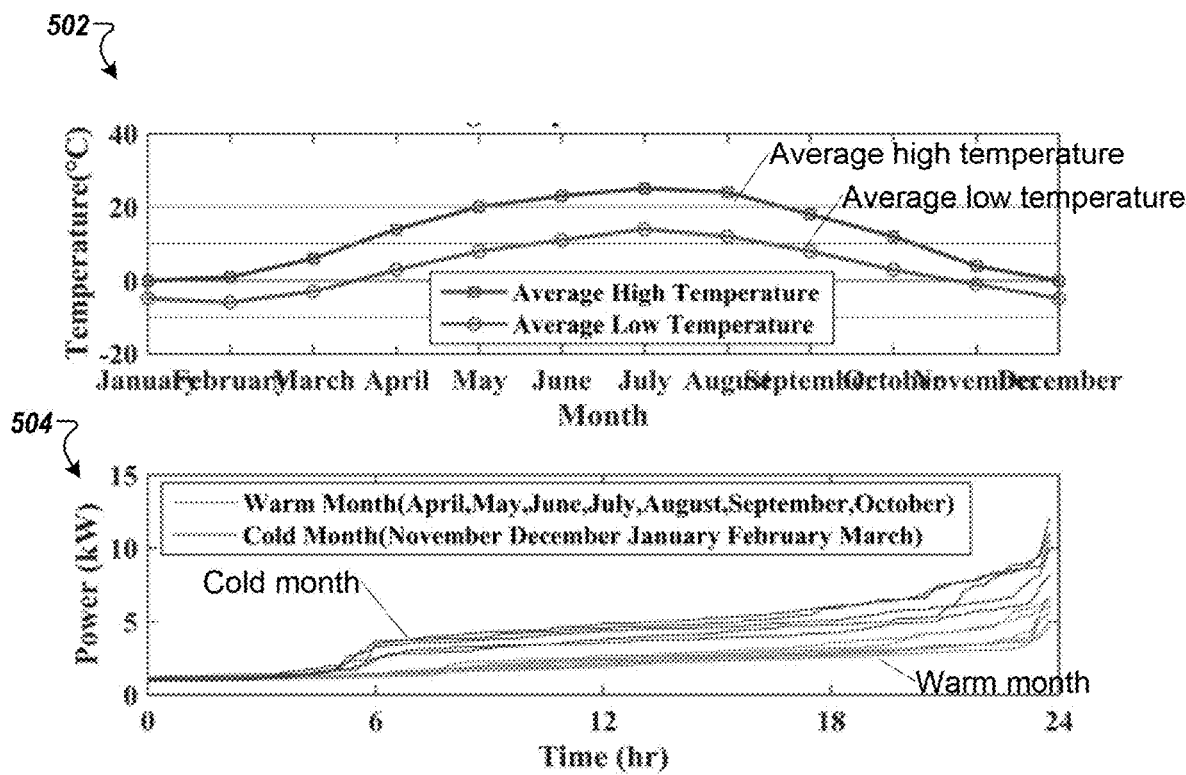
FIG. 5 shows a daily load duration curves for cold and warm months according to one example.

FIG. 5 shows the daily average load duration curves for a residential home and the average daily high and low temperatures of each month. The Olypen load is winter-peaking because electric space heaters are used as shown in schematic 504. Schematic 502 shows the average high and low temperatures for each month. In summer months, the average daily high temperature is about 25 C, so the cooling load is low. Because load consumption patterns are very different in the summer and winter seasons, the yearly data is divided into two seasons: cold and warm, as shown in Table I. Thus, the energy storage size selection is a function of seasonal load variations.

TABLE I

| Season categorization for ESD sizing | |
| --- | --- |
| Cold season | November, December, January, February, March |
| Warm season | April, May, June, July, August, September, October |

Figure 6:
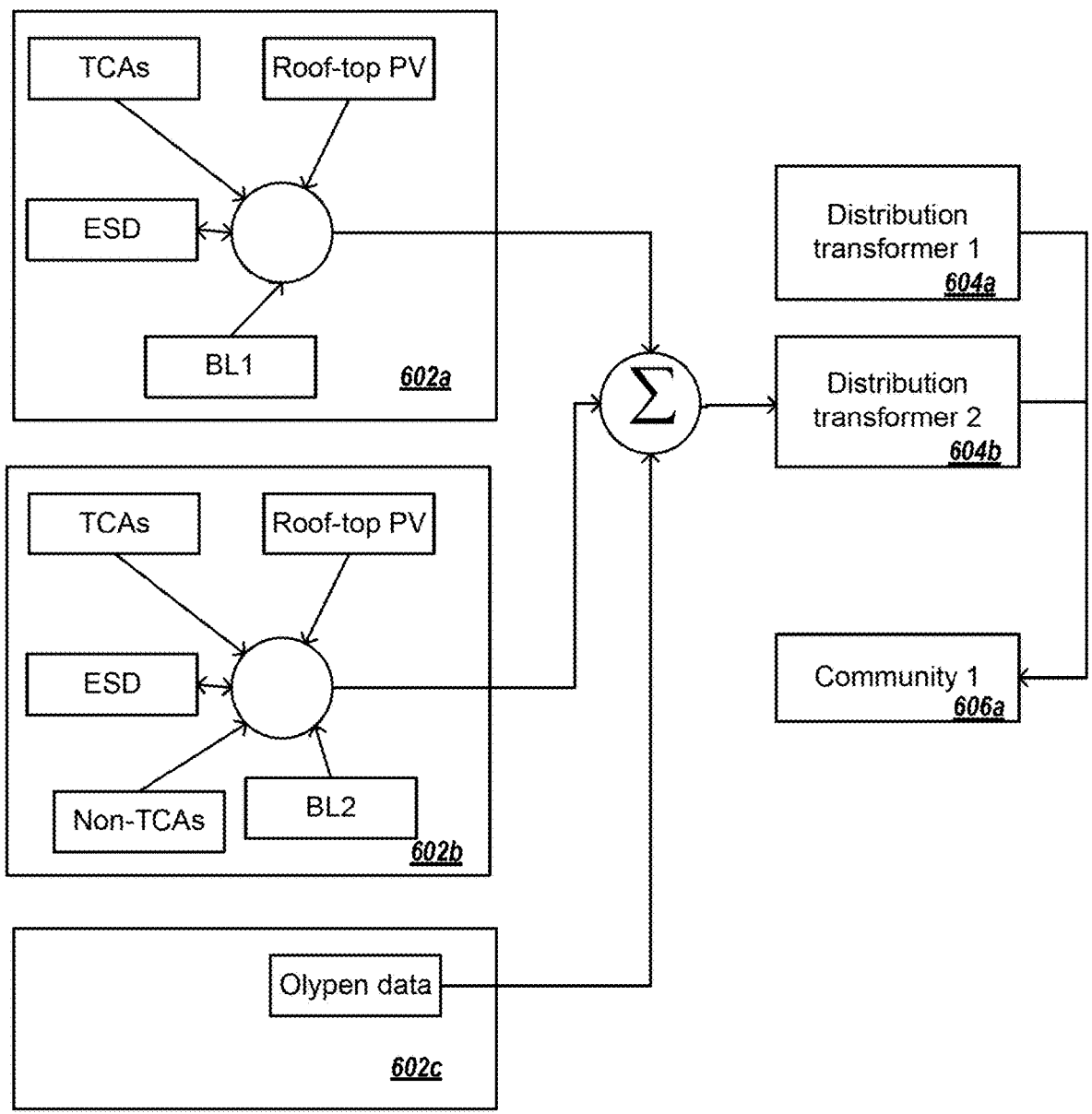
FIG. 6 is a block diagram of a tri-level system according to one example.

Next, the ESD sizing procedure and methodologies are described. As shown in FIG. 6, the system may include three levels: home-level 602 (e.g., 602a, 602b, 602c) transformer-level 604 (e.g., 604a, 604b), and community-level 606 (e.g., 606a). Three home types are modeled: home without controllable loads (i.e., 602c), with TCAs as controllable loads (i.e., 602a), and with both TCAs and non-TCAs as controllable loads (i.e., 602b). For homes using TCAs as controllable loads (i.e., 602a), BL1 profiles from the database 112 are used for baseload and outdoor temperature profiles are used as inputs to the TCA models. For homes using both TCAs and non-TCAs as controllable loads (i.e., 602b), BL2 profiles from the database 112 are used.

At the home-level, the PVs installed capacity ranges from 1 kW to 6 kW. ESDs within the community 128 can be shared for storing excess solar generation to decrease reverse power flow and smooth power variations.

The energy storage sizing method described herein include generating an ensemble of the net load profiles $P_{net}$, generating the compressed, composite CDF curve and using the equal probability line method to select the optimal ESD size.

In one implementation, the first step of the sizing process is the calculation of the ensemble of the home net load profiles using a shuffling algorithm. Let $P_{Solar}$ be the power output of a rooftop PV and $P_{Load}$ be the total household load consumption. The net load, $P_{net}$, can be calculated as:

$$P_{net}(i,j) = P_{Load}(i,j) - P_{Solar}(i,j)$$

$$i = 1, 2, \ldots, N_{days}\ N_{days}^{Cold} = 152\ N_{days}^{Warm} = 213$$

$$j = 1, 2, \ldots, N_{data}\ N_{data} = 96 \quad (1)$$

where i is the $i^{th}$ day, and j is the $j^{th}$ data point. In the exemplary residential load database used, there are 152 days in the cold season and 213 days in the warm season. Hence, $N_{days}^{Cold} = 152$ and $N_{days}^{Warm} = 213$. $N_{data}$ represents the data number in a day. In one example, the consumption is metered every 15-minute, hence $N_{data}$ is equal to 96.

The shuffling algorithm include replacing, for the $i^{th}$ day load profile, the solar radiation data of the $i^{th}$ day with that of the other 212 days to obtain an ensemble of net load profiles for the $i^{th}$ day. This process can be represented by:

$$\begin{vmatrix} P_{net}(i,1:j,1) \\ P_{net}(i,1:j,2) \\ \vdots \\ P_{net}(i,1:j,k) \\ \vdots \\ P_{net}(i,1:j,N_{days}) \end{vmatrix} = \begin{vmatrix} P_{Load}(i,1:j) \\ P_{Load}(i,1:j) \\ \vdots \\ P_{Load}(i,1:j) \\ \vdots \\ P_{Load}(i,1:j) \end{vmatrix} - \begin{vmatrix} P_{Solar}(1,1:j) \\ P_{Solar}(2,1:j) \\ \vdots \\ P_{Solar}(k,1:j) \\ \vdots \\ P_{Solar}(N_{days},1:j) \end{vmatrix} \quad (2)$$

where $k = 1, 2, \ldots, N_{days}$.

Figure 7:
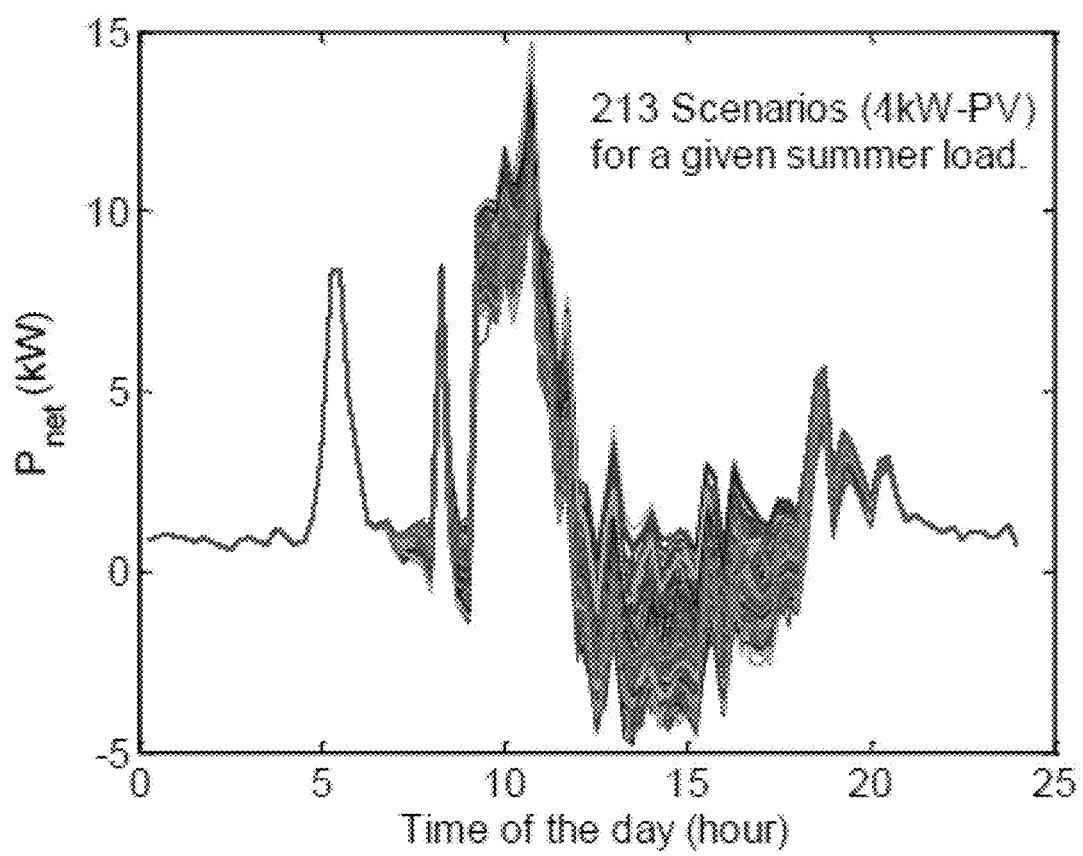
FIG. 7 is a schematic that shows an ensemble of a summer day net loads for a house according to one example.

The ensemble of net load profiles for a given summer load is shown in FIG. 7. To obtain the ensemble M of the net load profiles for the whole season, the shuffling step is repeated for all load profiles in the seasonal database (e.g., $N_{days}^{Cold} = 152$, $N_{days}^{Warm} = 213$):

$$M = \begin{bmatrix} P_{net}(1,1:j,1) \\ \ldots \\ P_{net}(1,1:j,N_{days}) \\ \vdots \\ P_{net}(i,1:j,1) \\ \ldots \\ P_{net}(i,1:j,N_{days}) \\ \vdots \\ P_{net}(N_{days},1:j,1) \\ \ldots \\ P_{net}(N_{days},1:j,N_{days}) \end{bmatrix}_{N_{days}^2 \times 96} = \quad (3)$$

$$\begin{bmatrix} M(1,1) & \ldots & M(1,96) \\ M(2,1) & & M(2,96) \\ \vdots & \ldots & \vdots \\ M(N_{days} \times N_{days}, 1) & \ldots & M(N_{days} \times N_{days}, 96) \end{bmatrix}$$

For instance, the ensemble matrix M for the warm season includes 213×213 net load profiles. This process is highly scalable. When more load and solar radiation data becomes available, $N_{days}$ can be increased to obtain more solar-load combinations. Shuffling the solar radiation data of the entire season against a load profile might result in unrealistic cases. However, the more measurements are included in the database, the closer the obtained net load profiles reflect the actual statistics because the unrealistic cases become outliers that have little impact on the final result.

Although home-owned ESDs can be used for a variety of purposes, one of the main reasons for the consumer to own an ESD is to self-consume the solar power. Therefore, in one implementation, the ESD is controlled to minimize the backfeeding energy. Let $P_{ESD}(t)$ represent the power output of the ESD at time t and $E_{ESD}(t)$ represent the energy level of the ESD at time t. $P_{ESD}(t)$ is negative when charging and positive when discharging. Then, the power difference at time t, $\Delta P(t)$ can be calculated as:

$$\Delta P(t) = P_{load}(t) - P_{solar}(t) - P_{ESD}(t) \quad (4)$$

Define $P_{neg}(t)$ as the power backfed to the main grid and calculate $P_{neg}(t)$ as:

if $\Delta P(t) \geq 0, P_{neg}(t) = 0$ else $P_{neg}(t) = -\Delta P(t) \quad (5)$ Then, the objective of sizing home-owned ESD is to minimize the total backfeeding energy $E_{neg}$:

$$\min E_{neg} = \sum_{t=1}^{T} P_{neg}(t) \quad (6)$$

where $E_{neg}$ is the total backfeeding energy and T is the total time.

Let $E_{ESD}^{max}$ and $E_{ESD}^{min}$ be the upper and lower limits of the ESD and $E_{ESD}^{t}$ be the energy level of the ESD at time t. The optimization of equation (6) may be solved by a straight forward control strategy shown in FIG. 8. Other optimization methods may also be used to optimize equation (6). The ESD is charged whenever $P_{net}^{t}<0$ & $E_{ESD}^{t}<E_{ESD}^{Max}$, and discharged whenever $P_{net}^{t}>0$ & $E_{ESD}^{t}>E_{ESD}^{Min}$.

Figure 8:
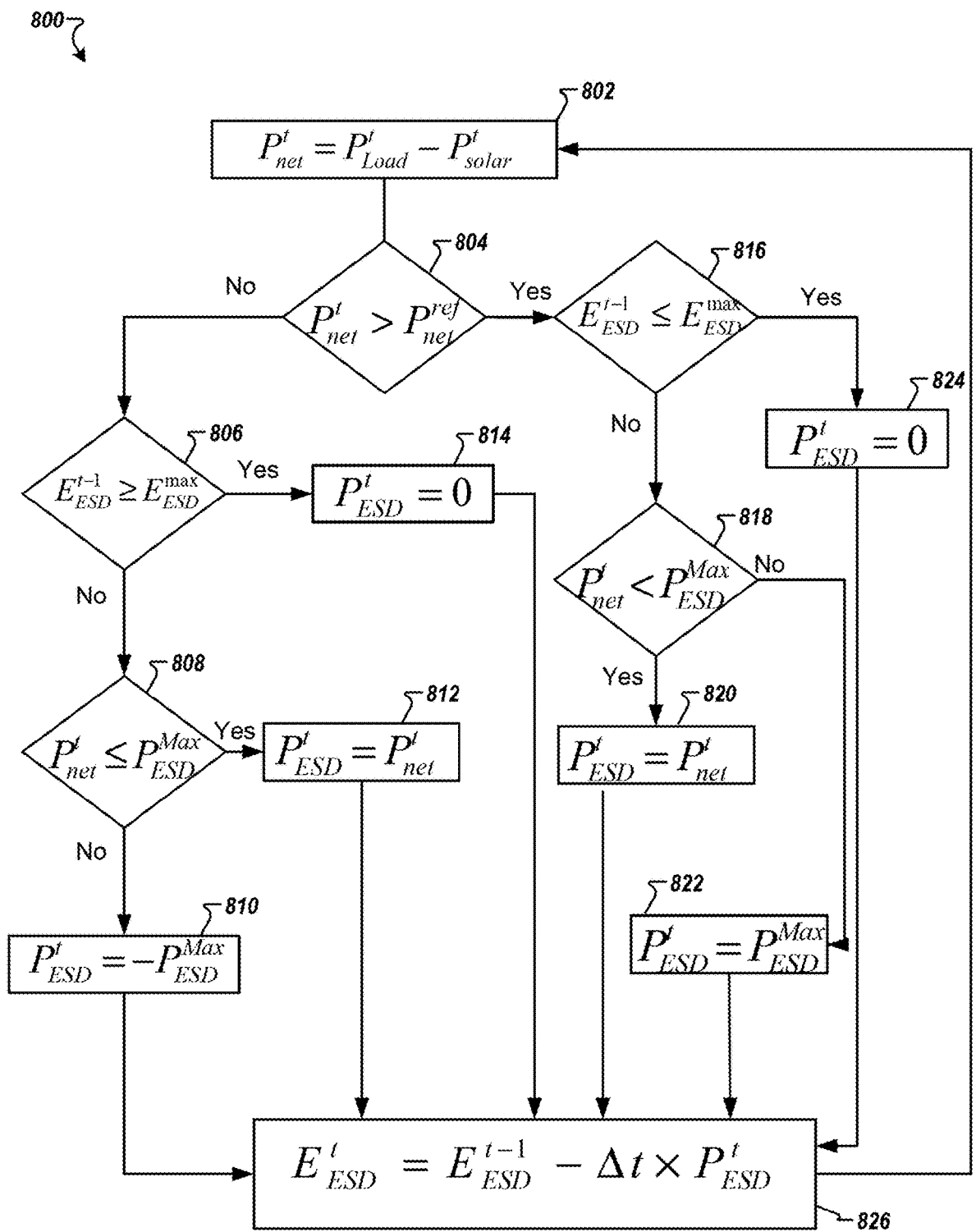
FIG. 8 is a flowchart of a method for minimizing backfeeding energy according to one example.

FIG. 8 is a flowchart that shows the forward control method 800 for minimizing the total backfeeding energy. At step 802, the net power at time t is determined. The net power may be determined as $P_{net}^{t} = P_{Load}^{t} - P_{solar}^{t}$. At step 804, the net power is compared with a reference net power $P_{net}^{ref}$. In one example, $P_{net}^{ref}$ is set to zero and the charging and discharging efficiency are both set to 90%. $P_{net}^{ref}$ may be input by the user. $P_{net}^{ref}$ represents a backfeed energy tradeoff. In response to determining that the net power is greater than the reference net power, the process proceeds to step 816. In response to determining that the net power is less than the reference net power, the process proceeds to step 806.

At step 806, the energy level of the ESD at time t−1 is compared with the upper limit of the ESD. In response to determining that the energy level at time t−1 is greater than the upper limit of the ESD, the process proceeds to step 814. In response to determining that the energy level is less than the upper limit, the process proceeds to step 808. At step 814, $P_{ESD}^{t}$ is set to zero. Then, the process proceeds to step 826.

At step 808, the net power at time t is compared with an upper limit of the power of the ESD. In response to determining that the net power is below or equal to the upper limit the process proceeds to step 812. In response to determining that the net power is greater than the upper limit, the process proceeds to step 810. At step 810, the $P_{ESD}^{t}$ is set to $-P_{ESD}^{Max}$. Then, the process proceeds to step 826. At step 812, the $P_{ESD}^{t}$ is set to $P_{net}^{t}$. Then, the process proceeds to step 826.

At step 816, the energy level at time t−1 is compared with the upper limit of the ESD. In response to determining that the energy level is less than the upper limit of the ESD, the $P_{ESD}^{t}$ is set to zero at step 824. Then, the process proceeds to step 826. In response to determining that the energy level is greater than the upper limit of the ESD, the process proceeds to step 818.

At step 818, the net power is compared with the upper power limit of the ESD. In response to determining that the net power is below the upper power limit, the process proceeds to step 820. In response to determining that the net power is greater than the upper power limit of the ESD, the process proceeds to step 822.

At step 820, $P_{ESD}^{t}$ is set to $P_{net}^{t}$. At step 822, $P_{ESD}^{t}$ is set to $P_{ESD}^{Max}$. Then, the process proceeds to step 826. At step 826, $E_{ESD}^{t}$ is set to $E_{ESD}^{t-1} - \Delta t \times P_{ESD}^{t}$. Then, the process proceeds to step 802.

Figure 9:
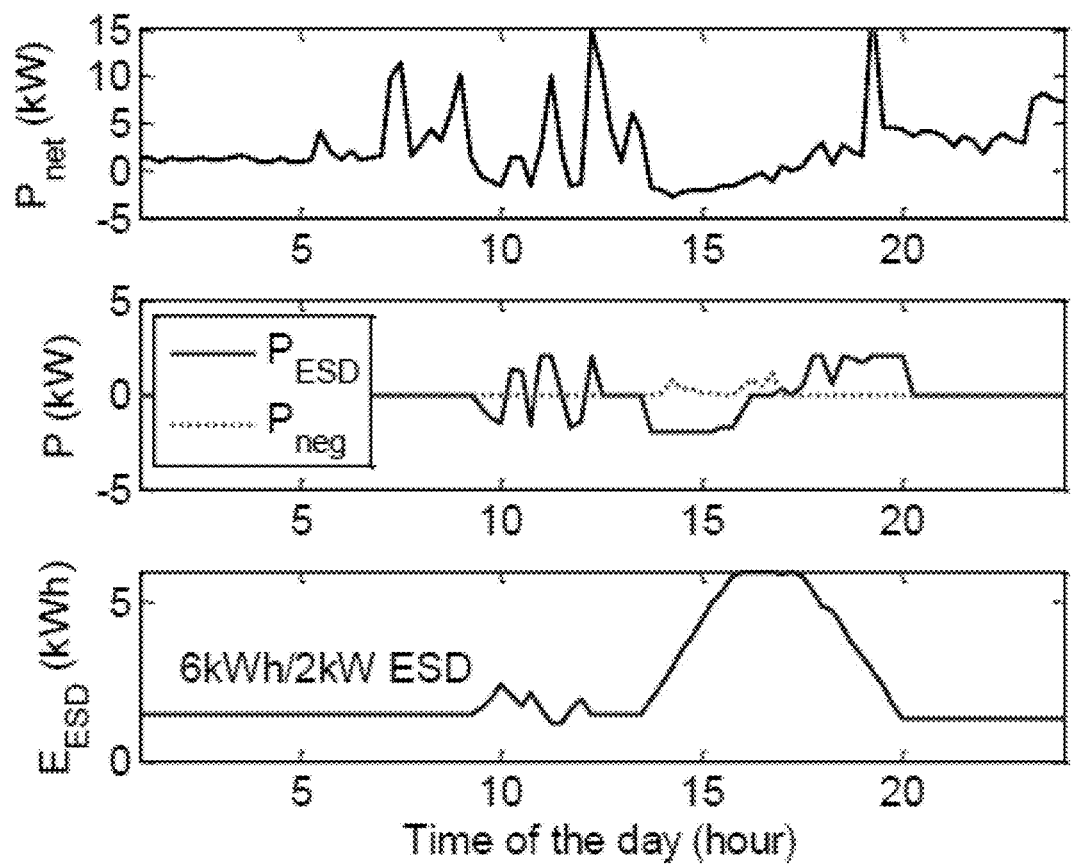
FIG. 9 is a schematic that shows a daily operation sample of an energy storage device (ESD) according to one example.
Figure 10A:
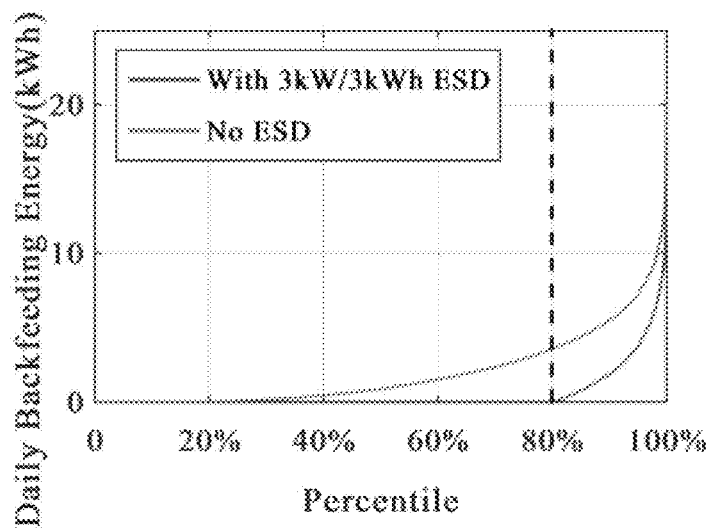
FIG. 10A is a schematic that shows the cumulative distribution function (CDF) of the daily backfeeding energy according to one example.
Figure 10B:
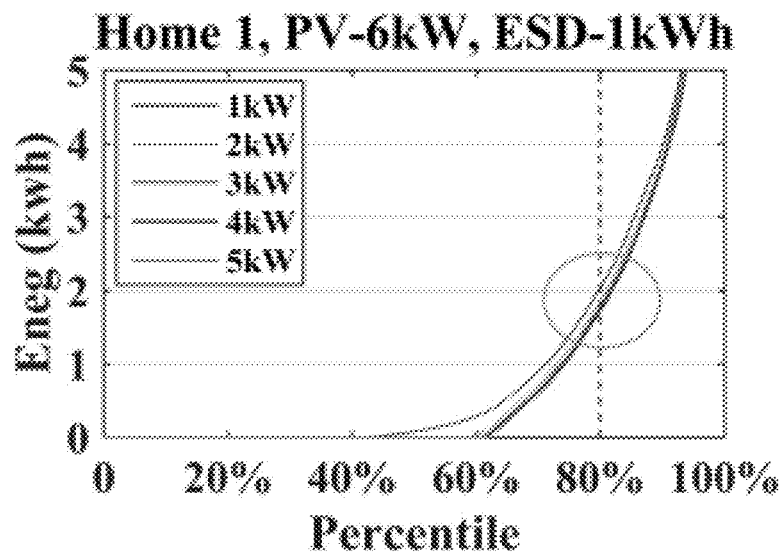
FIG. 10B is a schematic that shows the CDF of the daily backfeeding energy according to one example.
Figure 10C:
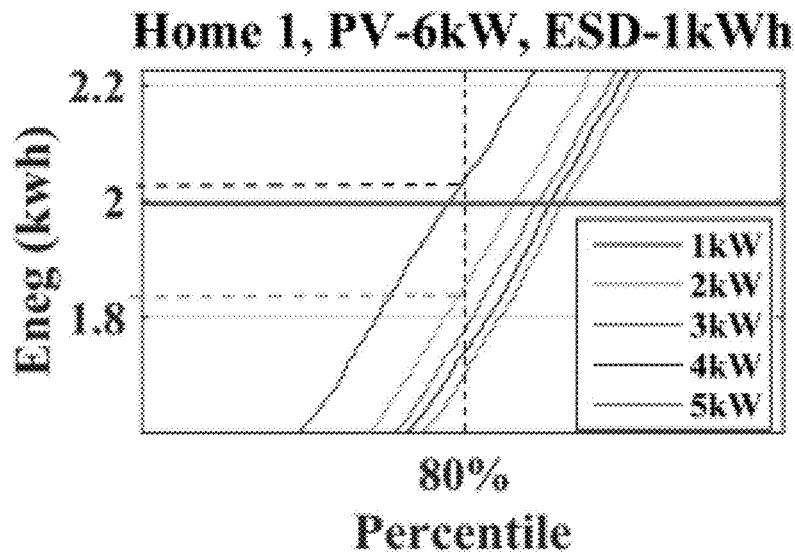
FIG. 10C is a schematic that shows the CDF of the daily backfeeding energy according to one example.

An example of the daily operation of an ESD is shown in FIG. 9. For a given combination of $P_{ESD}$ and $E_{ESD}$, process 800 is executed to calculate $E_{neg}$ for all the net load profiles in M. The process output is 213×213 and 152×152 sets of $E_{neg}$ values in the warm and cold seasons, respectively. Those values are used to generate the cumulative distribution function (CDF) curve for a given energy storage size. The CDF curve of the backfeeding energy in the cold season for a 3 kW/3 kWh ESD is shown in FIG. 10A and is compared with the CDF curve of the No-ESD case. Let $E_{ESD}$ equals to 1 kWh and $P_{ESD}$ increases from 1 kW to 5 kW. The CDFs of the five cases is calculated. The CDFs are shown in FIG. 10B. The zoom-in plot in FIG. 10C at the 80% quantile shows that increasing the power rating from 1 kW to 5 kW while maintaining the energy capacity at 1 kWh can only reduce $E_{neg}$ by 0.4 kWh. This shows that the energy capacity of the ESD may be a limiting factor.

Let $E_{neg}^{Target}$ represents the user defined backfeeding energy constraints. To find the smallest $P_{ESD}$ and $E_{ESD}$ that can meet the constraints, if $E_{neg}$ meets the targeted values of $E_{neg}^{Target}$, the $P_{ESD}$ or $E_{ESD}$ are reduced by $\Delta P_{ESD}^{Band}$ or $\Delta E_{ESD}^{Band}$, respectively, until the $P_{neg}^{Target}$ and $E_{neg}^{Target}$ cannot be met; if $E_{neg}$ cannot meet the targeted values of $E_{neg}^{Target}$, the $P_{ESD}$ or $E_{ESD}$ are increased until the $P_{neg}^{Target}$ and $E_{neg}^{Target}$ can be met.

The cost difference, $\Delta C$, between self-consuming $E_{neg}^{Target}$ and selling $E_{neg}^{Target}$ to the grid, can be calculated as:

$$\Delta C = E_{neg}^{Target} \times (p_{buying} - p_{selling}) \quad (7)$$

where $p_{buying}$ is the price at which utilities buy extra solar power from homeowners, and $p_{selling}$ is the price for selling grid power to users. This allows the home-owner to determine a $E_{neg}^{Target}$ based on electricity prices. Another way of determining $E_{neg}^{Target}$ is the utility requirement at the point of coupling. In one implementation, a desired $E_{neg}^{Target}$ is predetermined and is an input to the system 102. For example, $E_{neg}^{Target}$ may be input to the system 102 by the user 120. In another example, $E_{neg}^{Target}$ may be retrieved based on a plurality of factors, for example similarity to other households (e.g., having the same utility supplier).

By compressing the x-axis of FIG. 10 into a 0-1 block, the CDF plots of different battery size options are shown sideby-side in one graphical representation to create the CC-CDF plot for comparing different available options.

As shown in FIG. 1, one CC-CDF plot consists of 25 CDFs that represent five $E_{ESD}$ size options (1, 2, 3, 4, and 5 kWh) and five $P_{ESD}$ options (1, 2, 3, 4, and 5 kW). The $E_{ESD}$ and $P_{ESD}$ may be automatically determined by the system 102 based on commercially available ESDs. In other implementations, the user may input the $E_{ESD}$ and $P_{ESD}$. If the points bearing the same cumulated probability of occurrence on the 25 CDF plots are connected together, a line known as the equal probability line (EPL) is obtained. For example, if all the points representing 80% cumulated probability of occurrence are connected together, the 80% EPL is obtained (i.e., trace 1102). By checking the y-axis of the intersection between the EPL and the CDF curves, the user can quickly find an ESD size for the home to meet the daily backfeeding energy limit 80% of time.

Figure 11:
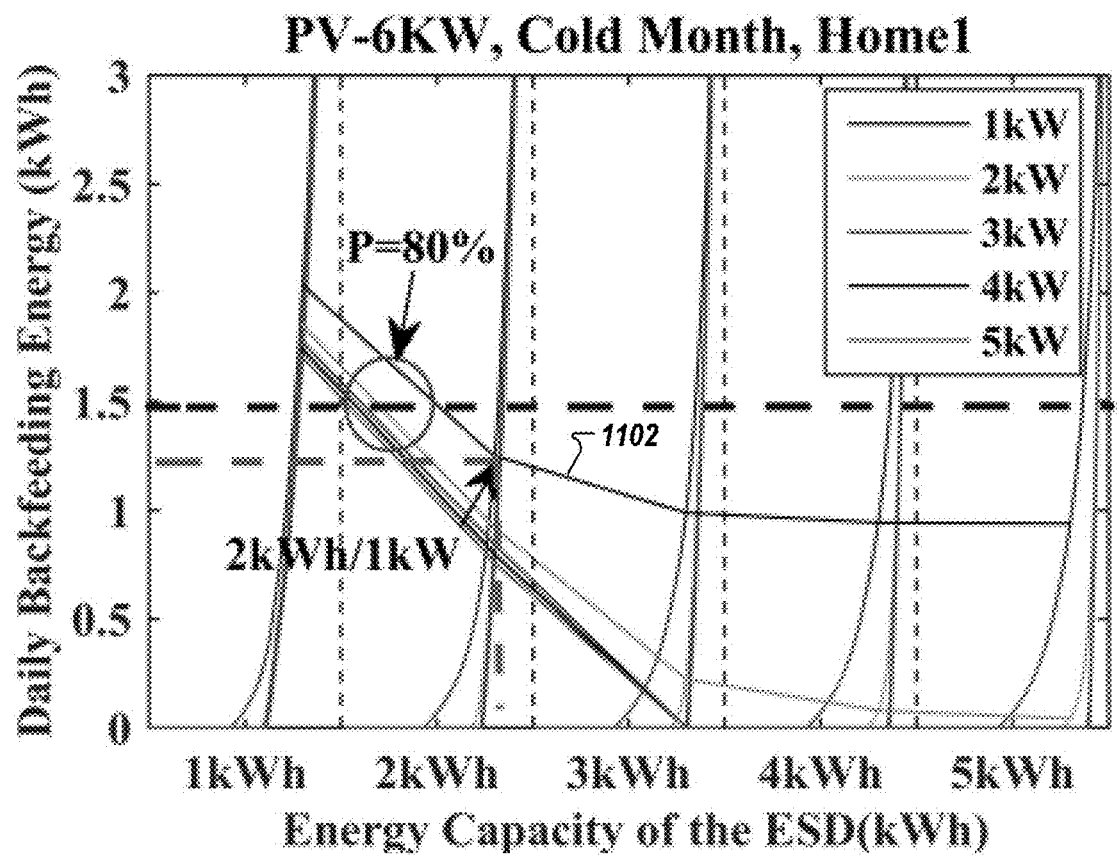
FIG. 11 is a schematic that shows the backfeeding energy according to one example.

In one example, assume that a customer requests to install a battery for a 6-kW PV system and the customer requests that the backfeeding power to the grid is below 1.5 kWh 80% of time. As shown in FIG. 11, as long as the battery energy capacity is above 2 kWh, the customer's requirement can be satisfied. Once the battery energy rating is above 3 kWh and power rating is above 2 kW, the marginal reduction of backfeeding energy by increasing the battery energy and power sizes are diminishing, so the customer may want to select at most a 3 kWh/2 kW battery. If the battery cost is also known, how much it costs to reduce backfeeding energy for any given PV capacity can also be calculated.

Figure 12:
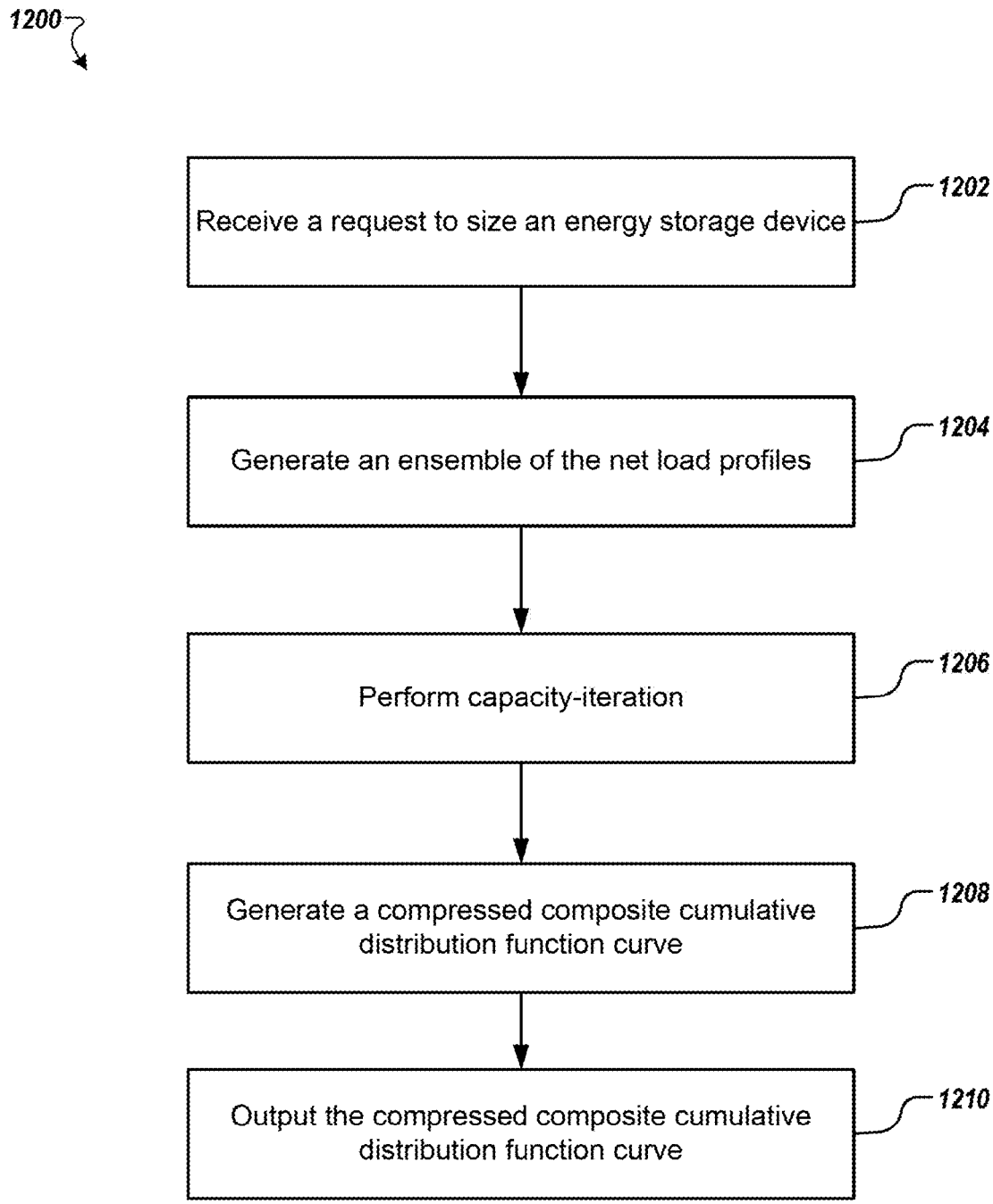
FIG. 12 is an exemplary flowchart of method for sizing a capacity of an energy storage device.

FIG. 12 is an exemplary flowchart for a method 1200 for sizing a capacity of an energy storage device. The method 1200 is performed by one or more of the processing engines of the storage capacity sizing system 102, such as the monitoring engine 104, the data management engine 106, the net load ensemble engine 108, and the CC-CDF determination engine 110.

At step 1202, the system 102 may receive a request to size an ESD from a user. The data management engine 106 extracts information from the request to determine the load profile associated with an entity such as a home, a community, or a transformer. As described previously herein, in some implementations, the user may upload a residential load profile associated with the home. In other implementations, the monitoring engine 108 may monitor one or more consumer devices for a predetermined time period to determine the residential load profile.

At step 1204, the net load ensemble engine 108 generates the ensemble of the net load profiles. For example, the net load ensemble engine 108 may apply equation (3) to generate the ensemble of net profile, such as shown in FIG. 7.

At step 1206, the CC-CDF determination engine 110 may perform capacity-iteration.

An exemplary implementation of step 1206 is process 800 shown in FIG. 8 and is performed by the CC-CDF determination engine 110.

At step 1208, the CC-CDF determination engine 110 may generate the CC-CDF associated with the user request for available energy capacity/output power of ESDs (e.g., devices that are available commercially) as described previously herein with respect to FIG. 11.

At step 1210, the CC-CDF is output to the electronic device 124 associated with the user 120. In one implementation, the system 102 may output the ESD with the minimum capacity that satisfies the user request.

At step 1212, the system 102 may output the CC-CDF to the electronic device 124 associated with the user 120. In one implementation, a rated power and storage capacity of the ESD is also determined and output to the electronic device 124.

In one implementation, the system 102 may output multiple CC-CDFs based on multiple rate structures (e.g., time of use rate and real time price). In other words, the energy storage control strategies (e.g., sizing) are determined for multiple rates and multiple sizing criteria.

In one implementation, the methodologies described herein may be used to provide sizing guidelines for utilities that includes information about the optimal location for energy storage and the associated size for each location.

To illustrate the capabilities of the system and methodologies described herein, exemplary results are presented.

Simulation results for sizing home-owned ESDs, transformer-ESDs, and community-owned ESDs are presented. Five $E_{ESD}$) options (1, 2, 3, 4, and 5 kWh) and five rated power options (1, 2, 3, 4, and 5 kW) are considered for six installed PV capacities (1, 2, 3, 4, 5, and 6 kW). Two different load patterns (winter and summer) are compared to assess the necessity of sizing ESDs for different seasons. The capabilities of using demand-side management (DSM) to reduce the size of the ESD are also assessed. For all the cases, results are produced using the capacity-iteration method and analyzed by projecting the 80% EPLs on the CC-CDF curves as described herein.

Figure 13:
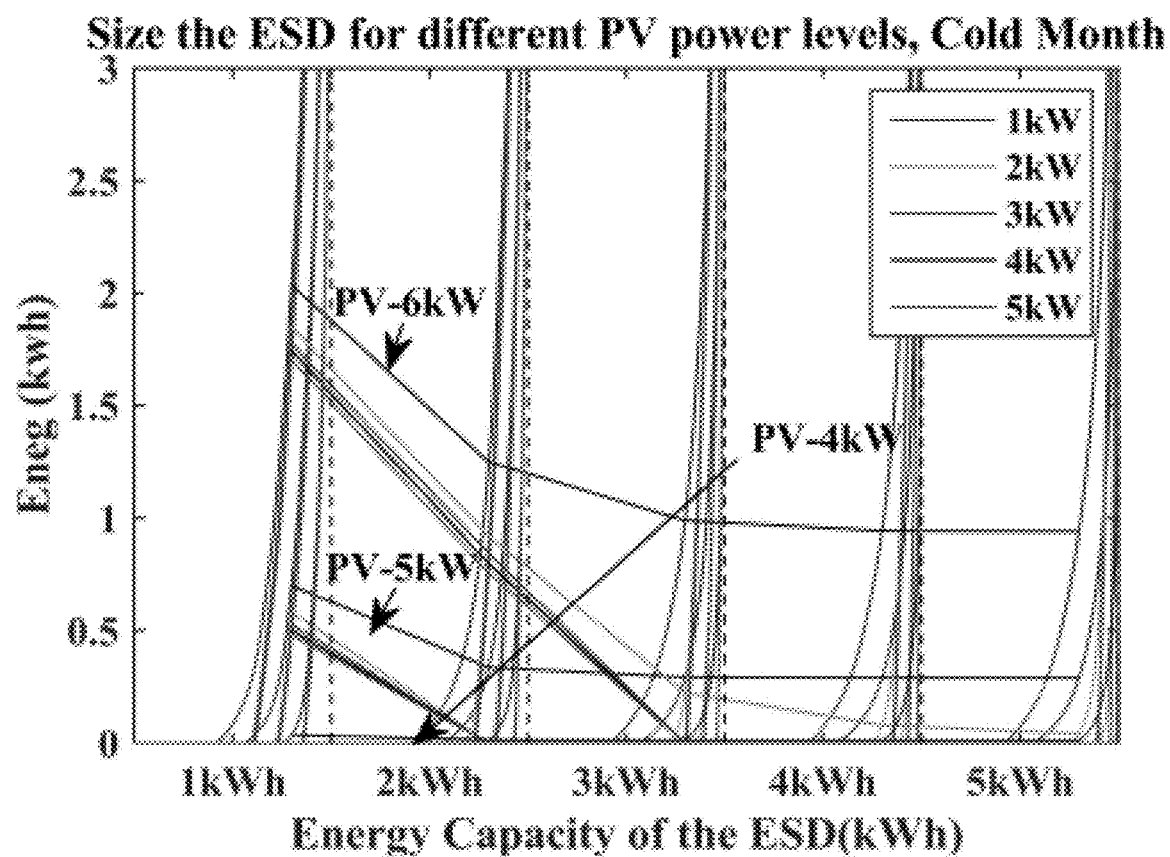
FIG. 13 is a schematic that shows sizing of ESDs for different PV power levels according to one example.

Exemplary results that show the sizing of the ESD considering the seasonal load pattern shifts is described next. The CC-CDF curves for the cold month loads are shown in FIG. 13. The 80% EPLs for installing a 4, 5, and 6-kW PV system are plotted for selecting the power and energy capacities of the energy storage system based on the daily backfeeding energy limit, $E_{neg}^{Target}$. FIG. 13 shows that if the PV capacity is less than 5 kW and $E_{neg}^{Target}$ is 1.5 kWh, there is no need for using an ESD. If the PV capacity is 6 kW, a 1 kW/2 kWh ESD may meet the $E_{neg}^{Target}$ 80% of the time. Another observation is that the power rating of the ESD is not as critical as the energy rating because increasing the power rating may not significantly reduce the backfeeding energy.

Figure 14:
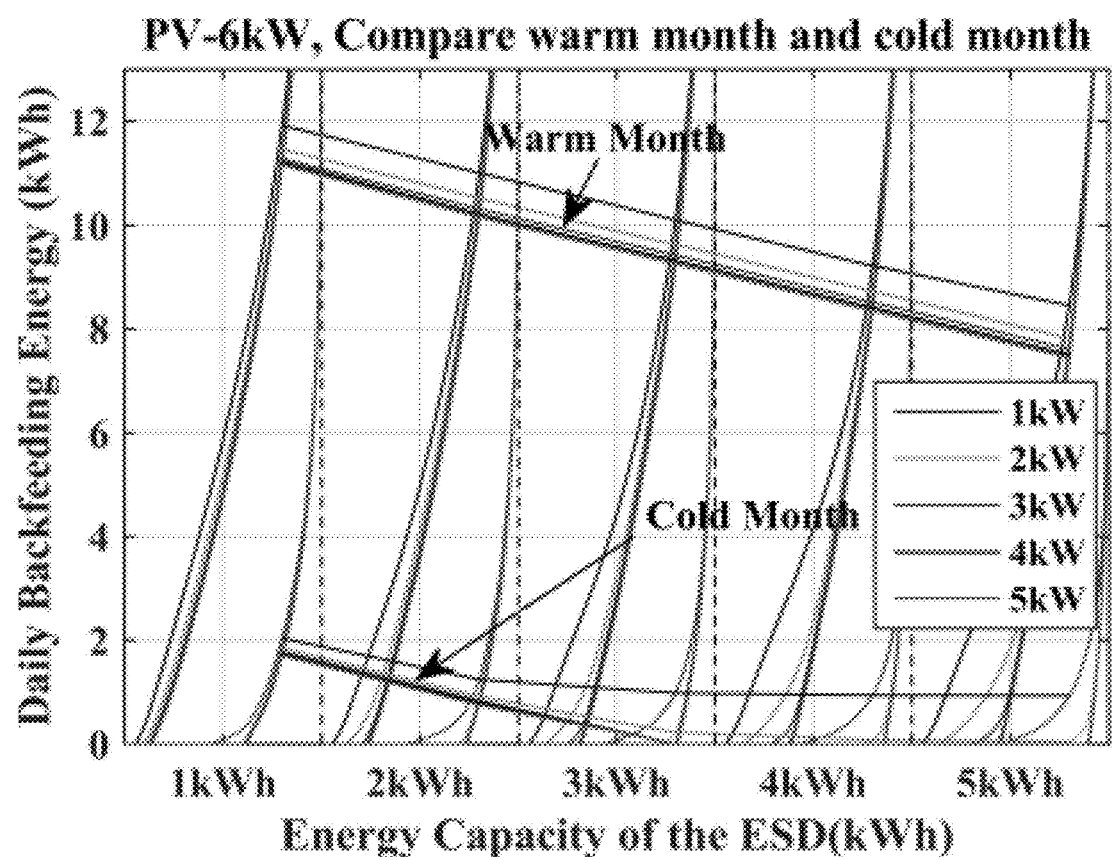
FIG. 14 is a schematic that shows sizing of ESDs for different seasons according to one example.
Figure 15B:
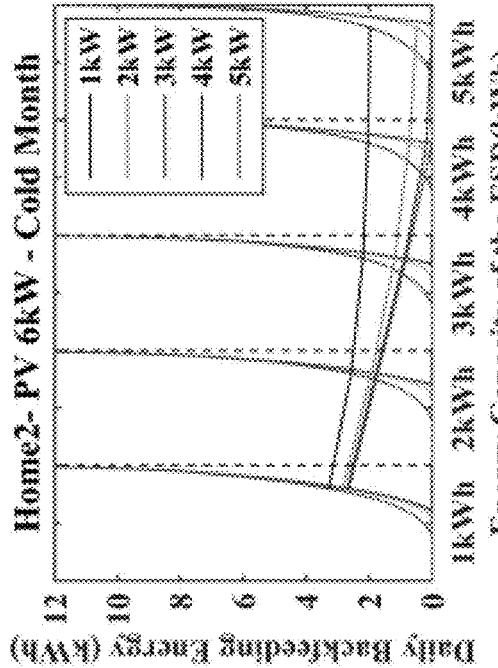
FIG. 15B is a schematic that shows sizing of ESDs for a second home according to one example.
Figure 15D:
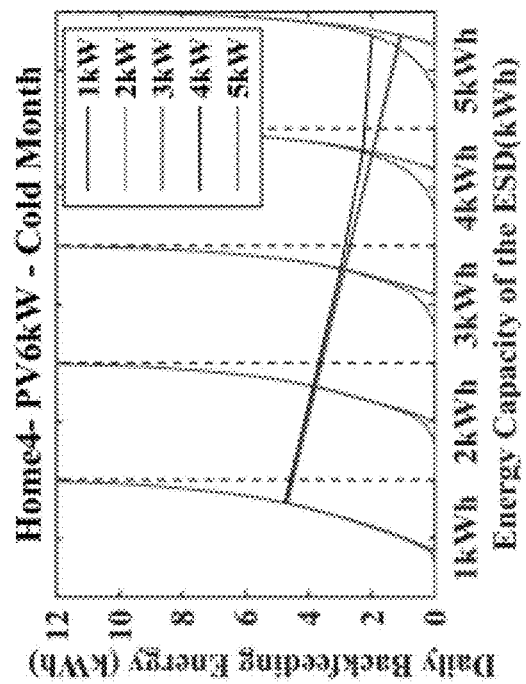
FIG. 15D is a schematic that shows sizing of ESDs for fourth homes according to one example.
Figure 15A:
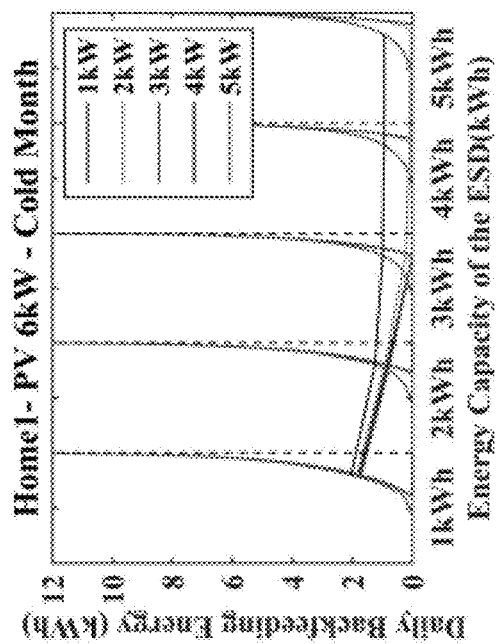
FIG. 15A is a schematic that shows sizing of ESDs for a first home according to one example.
Figure 15C:
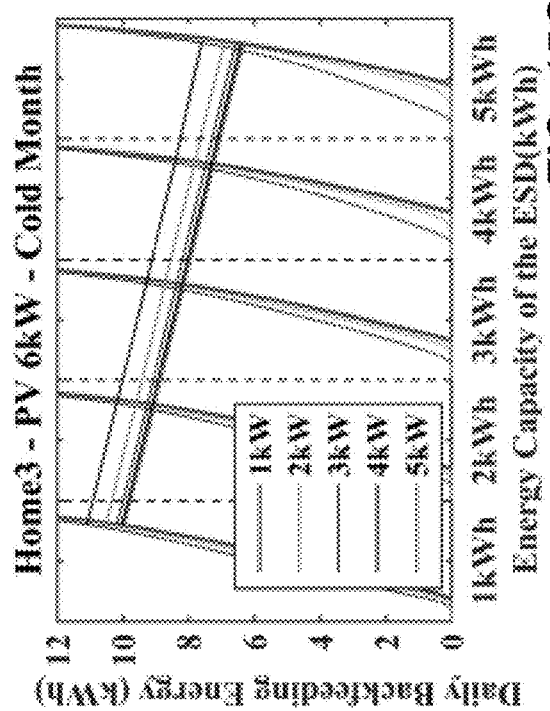
FIG. 15C is a schematic that shows sizing of ESDs for a third home according to one example.
Figure 16B:
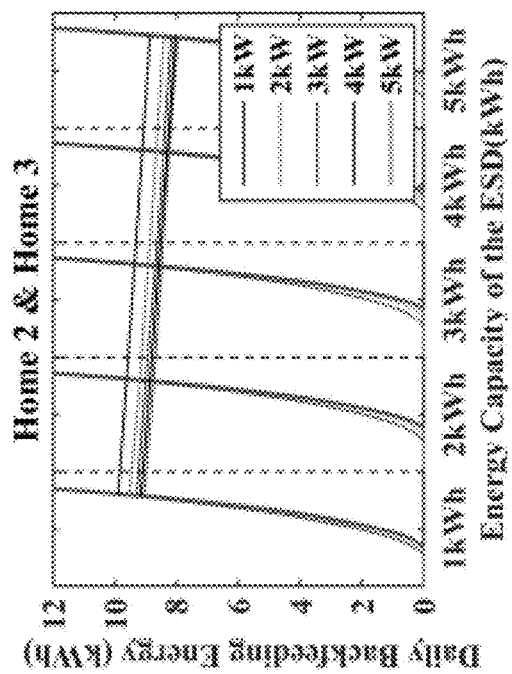
FIG. 16B is a schematic that shows sizing of ESDs for aggregated homes according to one example.
Figure 16D:
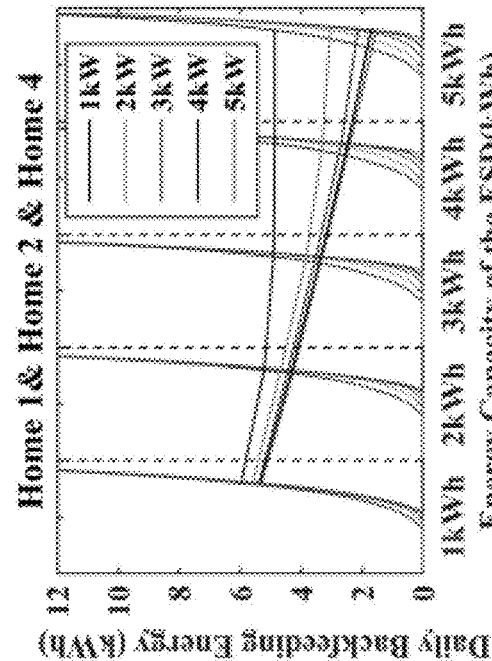
FIG. 16D is a schematic that shows sizing of ESDs for aggregated homes according to one example.
Figure 16A:
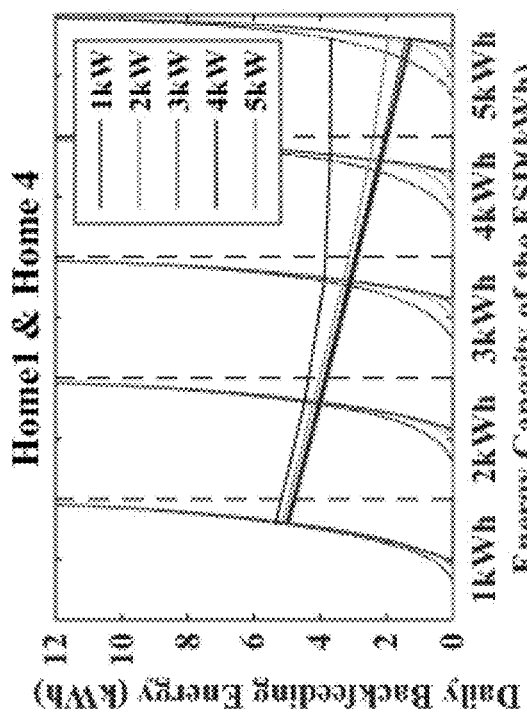
FIG. 16A is a schematic that shows sizing of ESDs for aggregated homes according to one example.
Figure 16C:
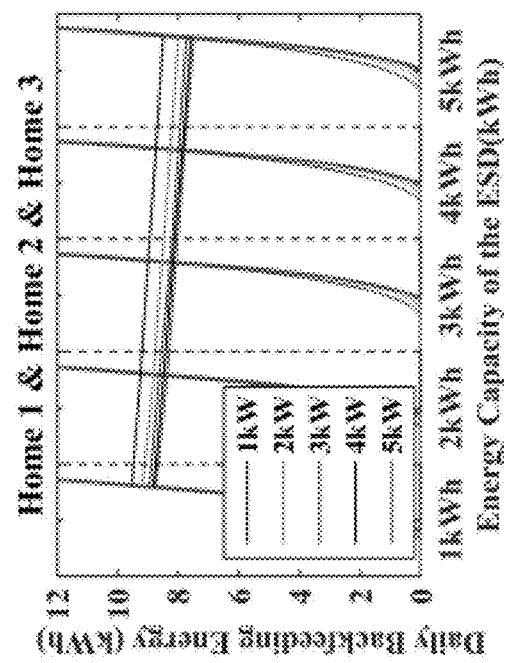
FIG. 16C is a schematic that shows sizing of ESDs for aggregated homes according to one example.

The CC-CDF curves of the summer months are shown in FIG. 14 by repeating the above analysis for the summer months. To better demonstrate the seasonal difference, a set of solar radiation data collected in the same area where the load data was collected is used to do the same analysis. Note that most houses in Olympic Peninsula have very low air conditioning loads because of the mild weather in that area. Therefore, in the summer months, the self-consumption capability of a household is very limited. As a result, there is a greater need for storing energy to meet the same $E_{neg}^{Target}$ in summer months than in the winter months. The result reveals that seasonal needs of energy storage can be very different. For example, in Southern cities, winter loads are low and summer loads are high, so the capability of self-consumption is higher in summer. Thus, ESD renting programs for meeting the different seasonal needs between summer and winter peaking regions may become an economic solution.

Sizing the ESD for aggregated residential loads at the transformer- and community-levels is described next.

The ESD sizing curves for 4 homes with 6-kW PV systems in the cold months are shown in FIGS. 15A-D. The CDF of the daily backfeeding energy of each home can be very different because each home has its unique consumption pattern and load characteristics. For example, a gas-heating residence has significantly lower energy consumptions than an electric heating one. When multiple homes share an ESD, the load diversity tends to increase the self-consumption capacity and reduce the ESD size.

FIGS. 16A-D show the results of sizing ESD for 2~3 homes. As expected, backfeeding energy decreases significantly for the same total ESD capacity. For instance, if home 2 and home 3 each has a 1 kWh/1 kW ESD, $E_{neg}$ can reach approximately 14 kWh. However, if these two homes share a 1 kWh/1 kW ESD, $E_{neg}$ can be reduced to approximately 9 kWh.

Figure 17:
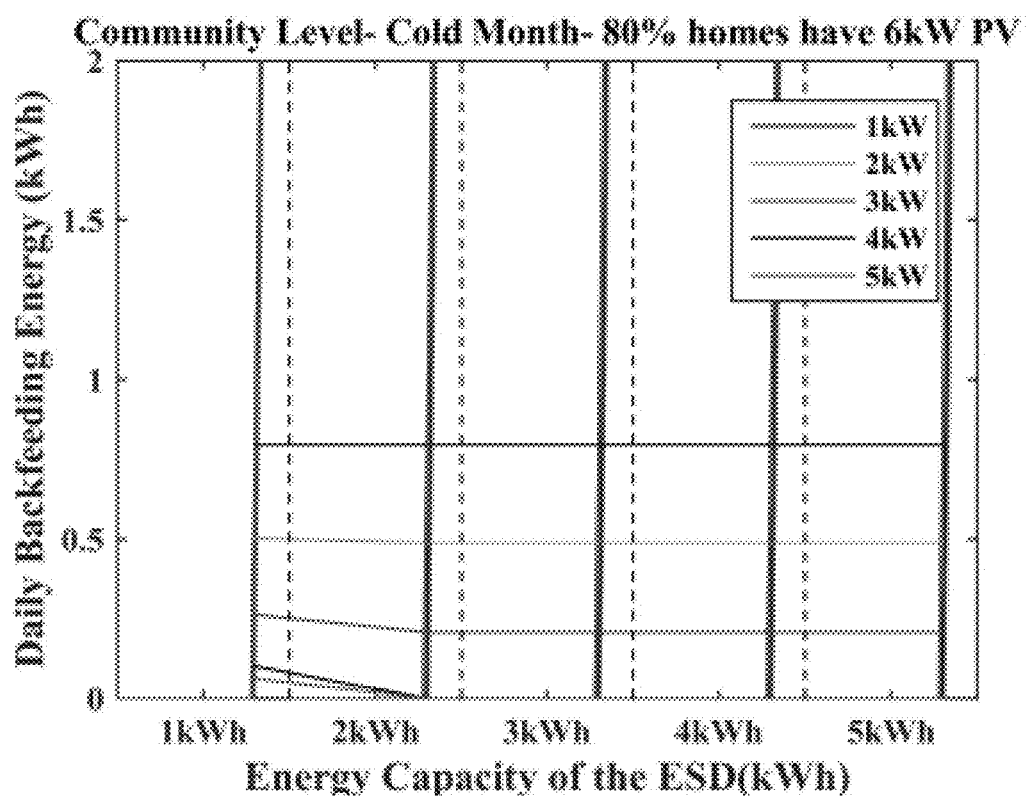
FIG. 17 is a schematic that shows sizing of ESDs for 80% photovoltaics (PV) penetration level according to one example.
Figure 18:
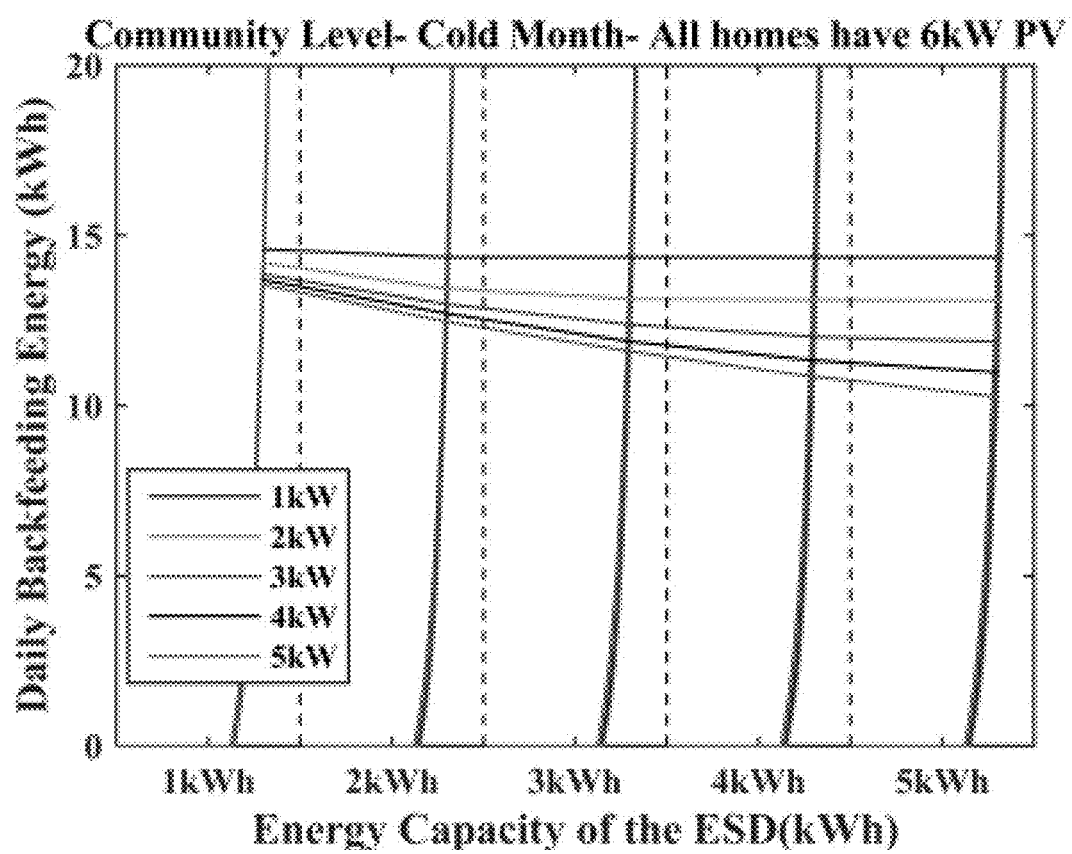
FIG. 18 is a schematic that shows sizing of ESDs for 100% PV penetration level according to one example.
Figure 19A:
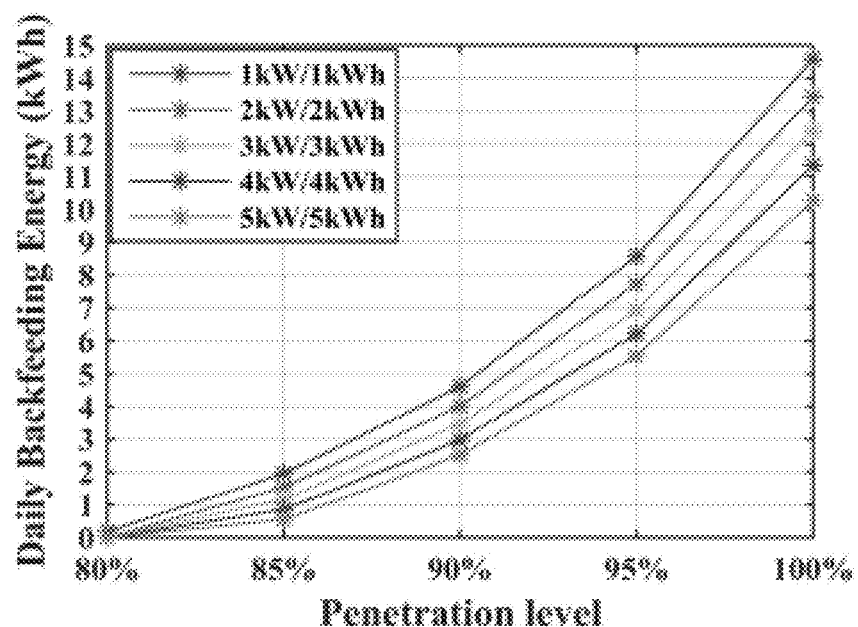
FIG. 19A is a schematic that shows the daily backfeeding energy for multiple PV penetration levels according to one example.

In one example, the PV penetration level of the community may be defined as the percentage of the homes in the community that have PV installed. The CC-CDF of a community with 33 homes using their winter net load ensembles is calculated. For each home with PV installed, the installed capacity is assumed to be 6 kW. As shown in FIG. 17, if the penetration level is less than 80%, there is no need to install an ESD using the following criteria: "$E_{neg}^{Target}$ is less than 1 kWh 80% of the time". However, if the penetration reaches 100% (see FIG. 18, for example) as all the 33 homes have a 6-kW PV system installed, $E_{neg}$ can increase significantly. If the capacity of the community ESD is still 1 kWh/1 kW, $E_{neg}$ can be controlled to be less than 15 kWh 80% of time. FIG. 19A shows the performances of different ESD capacity options when the PV penetration level increases from 80% to 100%. The plot also shows the expected improvement per capacity increase.

Figure 19B:
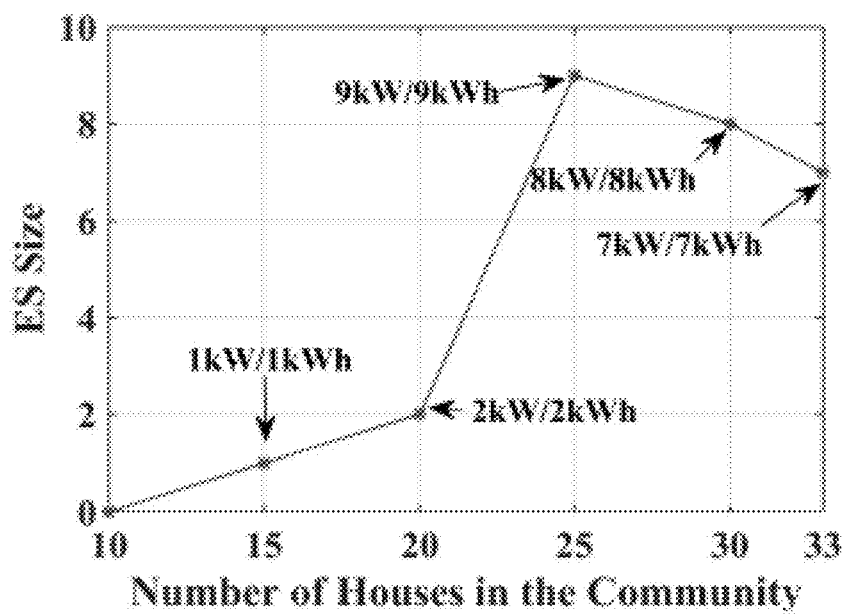
FIG. 19B is a schematic that shows the size of ESD for different PV penetration levels according to one example.

Set $E_{neg}^{Target}$ of a community at 8 kWh. Assume each house in the community has a 6 kW PV system installed such that the PV penetration level in the community is 100%. The optimal ESD sizes for a community with 10, 15, 20, 25, 30, or 33 houses are plotted in FIG. 19B. At first, the size of the ESD increases when there are more houses in the community. However, after the number of houses increase to 30 houses, the need for energy storage decreases. This is because the loads are more diversified when more houses are integrated in the community. As a result, more solar power can be self-consumed within the community.

Exemplary sizing of ESD as a function of demand-side management is described next. The ESD size is expected to be further decreased if DSM could be used for self-consumption of solar power. A DSM process 2000 is used to illustrate how to size an ESD when considering DSM. Thus, the method described herein may be used with a home energy management system and DSM system, to optimize energy usage and storage.

The air conditioning (AC) unit is controlled to assist the self-consumption of the PV power. The user may set up a high and low room temperature band $T_{low}$, $T_{high}$.

Figure 20:
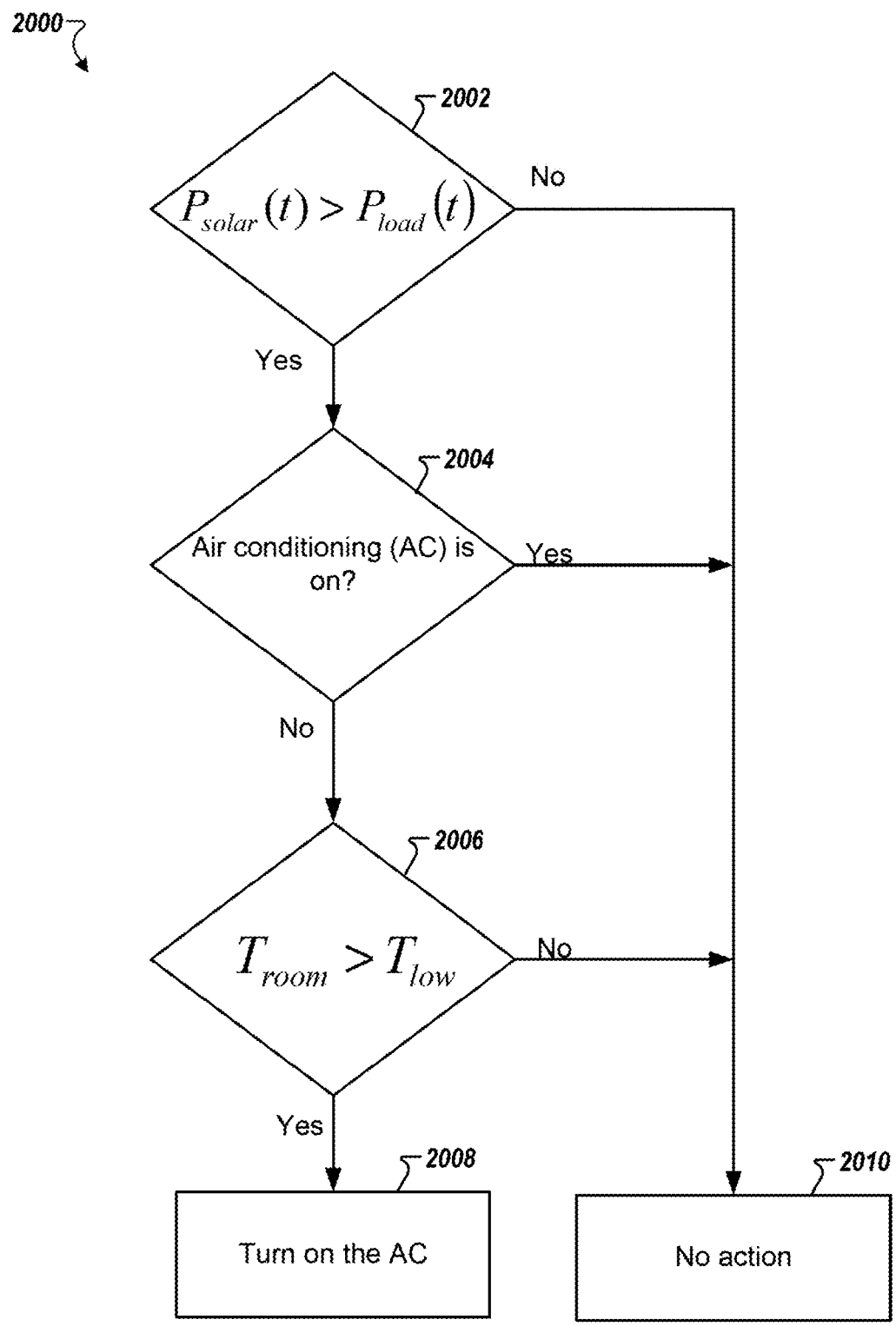
FIG. 20 is a flowchart of a method for demand-side management (DSM) according to one example.

FIG. 20 is a flowchart of a method 2000 for DSM. At step 2002, the $P_{solar}(t)$ and $P_{load}(t)$ may be checked at time t. If $P_{solar}(t)$ is greater than $P_{load}(t)$, then the process proceeds to step 2004. At step 2004, the AC status may be checked. If the AC status is "ON", the process proceeds to step 2010. If the AC status is "OFF", the process proceeds to step 2006. At step 2006, the room temperature is compared with the low room temperature. In response to determining that the room temperature is greater than the low room temperature, the process proceeds to step 2008. At step 2008, the AC is turned on. At step 2010, no action is taken.

Figure 21A:
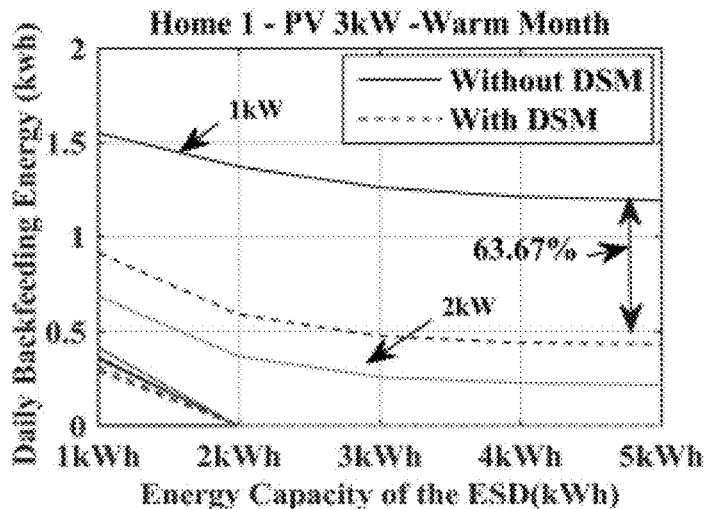
FIG. 21A is a schematic that shows the DSM's impact on sizing EDS at a home-level according to one example.
Figure 21B:
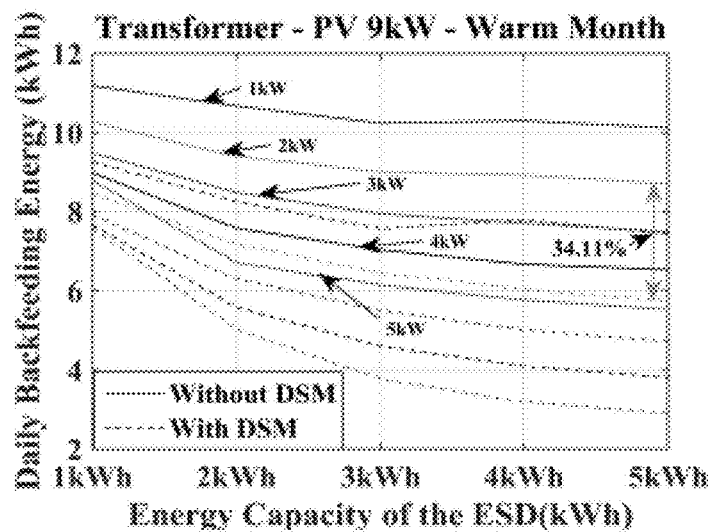
FIG. 21B is a schematic that shows the DSM's impact on sizing EDS at a transformer-level according to one example.
Figure 21C:
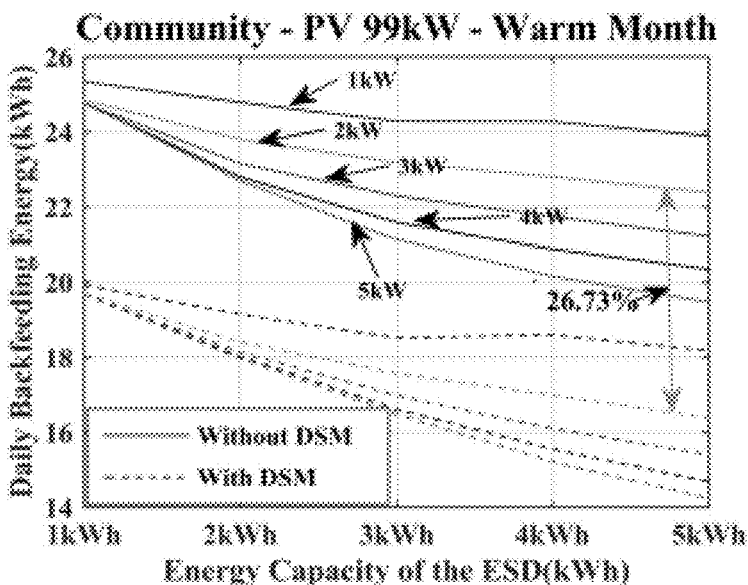
FIG. 21C is a schematic that shows the DSM's impact on sizing EDS at a community-level according to one example.

The simulation results at the home-, transformer-, and community-levels are shown in FIGS. 21A-C, respectively.

FIG. 21A shows the results of sizing the ESD with- and without-DSM at the home level. Applying DSM may decrease the size of the ESD significantly. For instance, if the ESD is 1 kW/5 kWh, $E_{neg}$ can be decreased by 64%.

The simulation results at the transformer level are shown in FIG. 21B. The percentage of $E_{neg}$ reduction is around 34% after using DSM. The size of the ESD is 3 kW/1 kWh to maintain the $E_{neg}^{Target}$ below 10 kWh without DSM. With DSM, the size of the ESD is reduced to 1 kW/1 kWh, representing a 67% reduction.

To further investigate the aggregation impact of using DSM for helping reducing the size of community ESD, aggregated loads of 33 homes (each home has a 3 kW roof PV system) are used. As shown in FIG. 21C, the percentage of $E_{neg}$ reduction by DSM is 27% at the community level. The above results show that applying DSM may reduce the size of ESD significantly.

Figure 22:
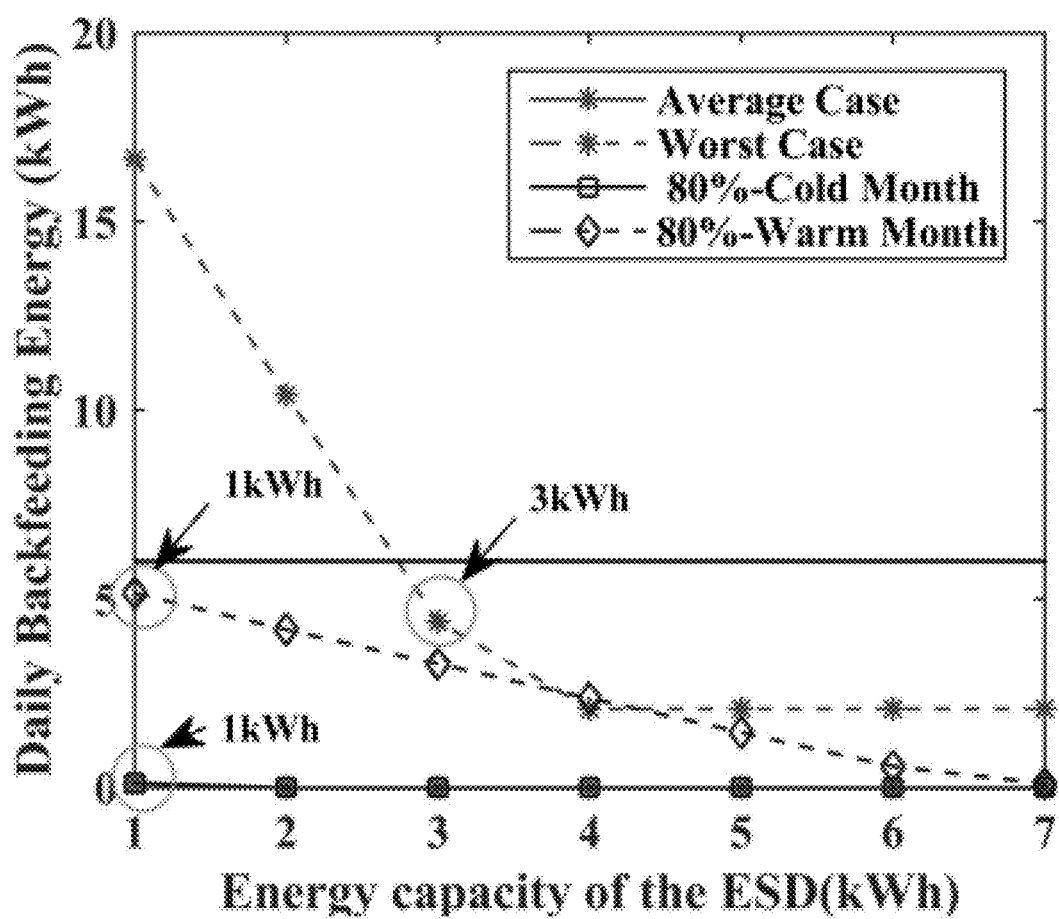
FIG. 22 is a schematic that shows backfeeding energy among different sizing methods according to one example.

Conventional sizing methods use the worst case scenarios or the average case scenarios for sizing ESDs. To compare with the results obtained by those sizing methods, $E_{neg}$ calculated by different sizing methods are compared in FIG. 22. The worst case scenario is obtained by using the net load in a sunny, light load day. The average case is obtained using the net load in a sunny, average load day. If a 5-kW PV and a 3-kW ESD are selected, the energy capacities of the ESD selected by different sizing methods are compared.

Assume that $E_{neg}^{Target}$ is 6 kWh, the methodology described herein suggests that the user can use a 3 kW/1 kWh ESD for the warm months and no ESD is needed in the cold months. The average case method suggests that no ESD is needed and the worst case method indicates that a 3 kW/3 kWh ESD is needed for an entire year. The comparison shows that the average case tends to underestimate the ESD needs and the worst case tends to overestimate the ESD needs depending on how the worst case is constructed.

Figure 23:
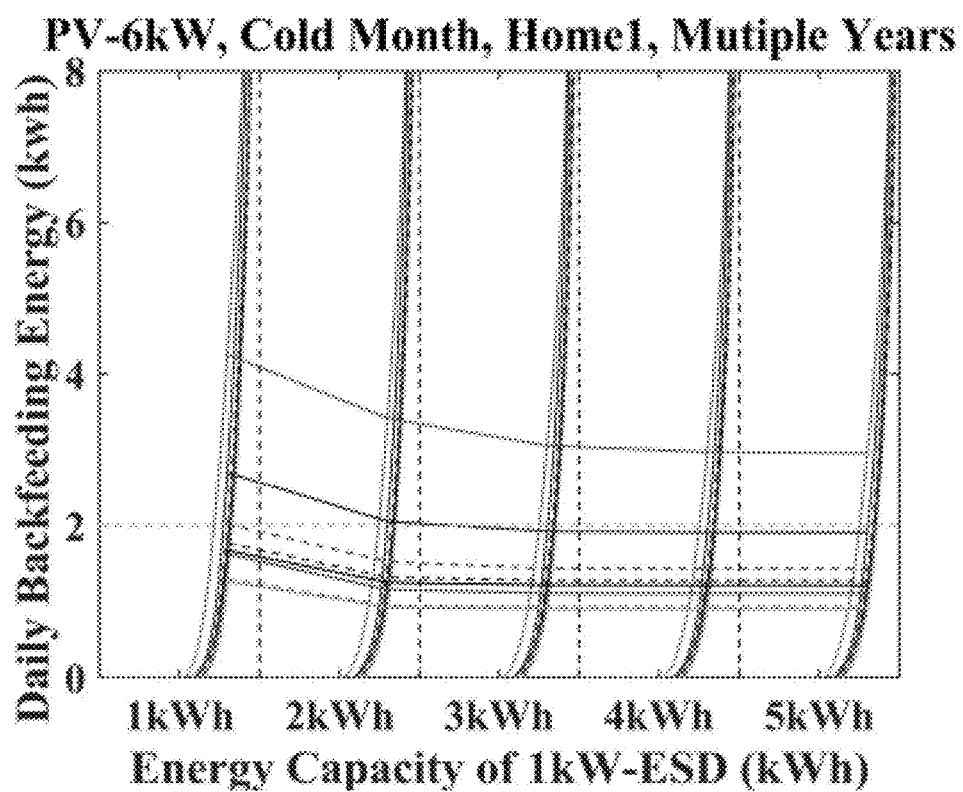
FIG. 23 is a schematic that shows simulation results for multiple years according to one example.

Solar radiation data from ten years (2001-2010) are used to compare results among different years. A 6 kW PV and 1 kW ESD are used. The simulation is conducted for the cold months. Assume that the load consumption patterns are similar for the 10 years. As shown in FIG. 23, the results are consistent for all the years except for 2005. Although the EPL of the year of 2005 is away from the EPLs of the others, the majority is very close to each other. The simulation results show that except for a few years, the results obtained using the method described herein are consistent. If more data are available, the upper and lower boundaries of the sizing curve can be obtained to further enhance the results.

Figure 24A:
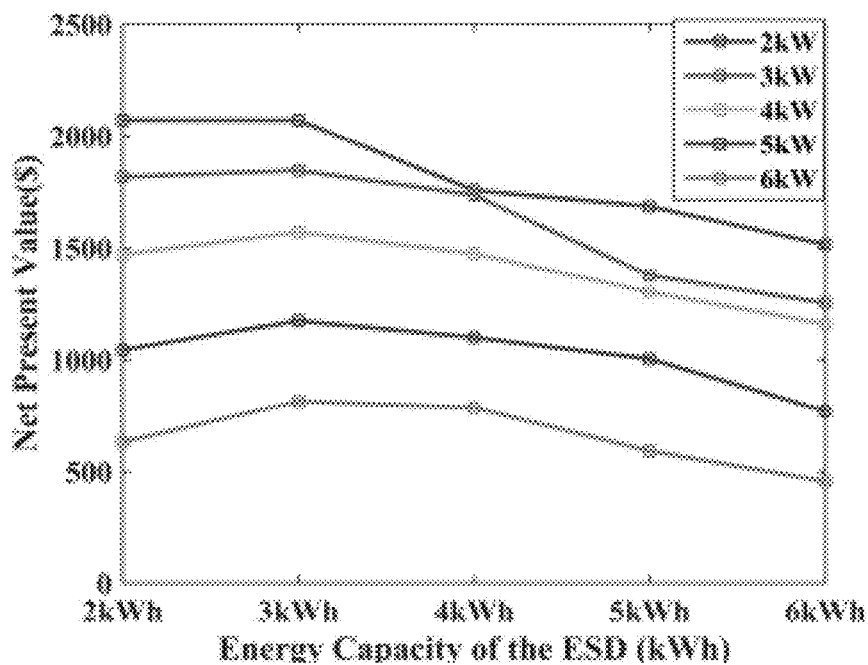
FIG. 24A is a schematic that shows the net present value of various ESD sizes according to one example.
Figure 24B:
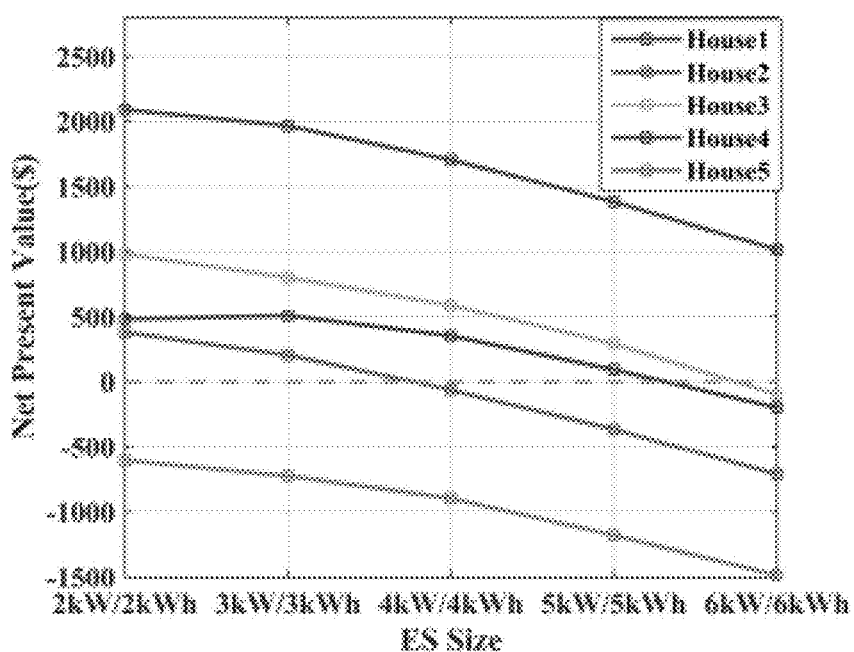
FIG. 24B is a schematic that shows the net present value of various ESD sizes according to one example.

An example of adding the cost-benefit element into the sizing considerations is described herein to show how to combine the performance-based sizing approach with the cost-based analysis. The time-of-use tariff used in the cost benefit study is obtained from the Duke Energy Progress website. The ESD price is $200/kWh and $175/kW. The price of a 6 kW residential PV panel is $1.5/W. The project span is considered as 25 years and the replacement cost of an ESD is estimated to be $200/kWh every 5 years. The net present values (NPV) of installing an ESD of different rated power and storage capacity at House 1 are plotted in FIG. 24A. FIG. 24B shows the NPV of installing an ESD from 2 kW/2 kWh to 6 kW/6 kWh at five different houses. The optimal ES size derived from the performance-based approach can then be compared with that of the cost-based approach to reach an optimal option that meets both budget constraints and performance expectations.

A system which includes the features in the foregoing description provides numerous advantages to users. In particular, because ensembles of daily load profiles are generated based on both the historical data and the load models, the selection of ESD power and energy capacity can be based on the consumers' or utilities' expectation of meeting a specified sizing criterion (such as meeting the backfeeding power and energy limit) with and without DSM. EPLs on a CC-CDF plot provide users with a compact graphical tool to select ESDs based on the probability of meeting a specified performance criterion. The gradients of the EPLs indicate the marginal benefit of the energy storage size increase.

The needs of ESDs at different locations for different seasons, and for various PV installed capacities can be compared using the methodologies described herein. In different seasons, the needs of using ESDs may vary greatly. Therefore, allowing some ESD capacity to be flexible (e.g. rented, mobile energy storage) may be more economical because the utilization rate of the overall energy storage system may increase. There exists an optimal combination of PV+ESD capacity for a given residential load pattern. Therefore, it is recommended to use a combined approach for sizing the ESD and PV together considering the load characteristics. Load diversity can significantly reduce the needs for storing excess PV power. Therefore, it is more economical for the utilities and load aggregators to provide energy storage services at the transformer- or community-levels than the home-level ESD deployment. Demand-side energy management systems reduce the size of ESD. However, coordination among demand side resources is needed to achieve desired performance at the aggregated level.

The CC-CDF and EPL methods described herein can be used for many other probabilistic-based evaluations with multiple optimization variables associated with monotonically increasing or decreasing continuous or discontinuous functions.

In particular, the system and associated methodology described herein provides an improvement to the field of renewable energy systems. The system is capable of storing, computing, and analyzing a large amount of data to determine an accurate capacity of the energy storage device. Thus, the system and associated methodology described herein amount to significantly more than an abstract idea based on the improvements and advantages described herein.

In one implementation, the functions and processes of the data management engine 106, the monitoring engine 104, the net load ensemble engine 108, and the CC-CDF determination engine 110 may be implemented by the computer 2526. Next, a hardware description of the computer 2526 according to exemplary embodiments is described with reference to FIG. 25. In FIG. 25, the computer 2526 includes a CPU 2500 which performs the processes described herein. The process data and instructions may be stored in memory 2502. These processes and instructions may also be stored on a storage medium disk 2504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1826 communicates, such as a server or computer.

Further, the claimed advancements may be provided as a utility application, background daemon, or component of an operating system, or combination thereof, executing in conjunction with CPU 2500 and an operating system such as Microsoft® Windows®, UNIX®, Oracle® Solaris, LINUX®, Apple macOS® and other systems known to those skilled in the art.

In order to achieve the computer 2526, the hardware elements may be realized by various circuitry elements, known to those skilled in the art. For example, CPU 2500 may be a Xenon® or Core® processor from Intel Corporation of America or an Opteron® processor from AMD of America, or may be other processor types that would be recognized by one of ordinary skill in the art. Alternatively, the CPU 2500 may be implemented on an FPGA, ASIC, PLD or using discrete logic circuits, as one of ordinary skill in the art would recognize. Further, CPU 2500 may be implemented as multiple processors cooperatively working in parallel to perform the instructions of the inventive processes described above.

The computer 2526 in FIG. 25 also includes a network controller 2506, such as an Intel Ethernet PRO network interface card from Intel Corporation of America, for interfacing with network 2524. As can be appreciated, the network 2524 can be a public network, such as the Internet, or a private network such as LAN or WAN network, or any combination thereof and can also include PSTN or ISDN sub-networks. The network 2524 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 2526 further includes a display controller 2508, such as a NVIDIA® GeForce® GTX or Quadro® graphics adaptor from NVIDIA Corporation of America for interfacing with display 2510, such as a Hewlett Packard® HPL2445w LCD monitor. A general purpose I/O interface 2512 interfaces with a keyboard and/or mouse 2514 as well as an optional touch screen panel 2516 on or separate from display 2510. General purpose I/O interface also connects to a variety of peripherals 2518 including printers and scanners, such as an OfficeJet® or DeskJet® from Hewlett Packard®.

The general purpose storage controller 2520 connects the storage medium disk 2504 with communication bus 2522, which may be an ISA, EISA, VESA, PCI, or similar, for interconnecting all of the components of the computer 2526. A description of the general features and functionality of the display 2510, keyboard and/or mouse 2514, as well as the display controller 2508, storage controller 2520, network controller 2506, and general purpose I/O interface 2512 is omitted herein for brevity as these features are known.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for sizing energy storage device capacity, comprising:
generating, via processing circuitry, a load profile of at least one consumer device based on at least information acquired by a user interface, the load profile including controllable loads and uncontrollable loads, and the controllable loads including temperature sensitive loads and behavior sensitive loads;

monitoring for a predetermined time period the load profile;

monitoring for the predetermined time period a power output generated by an energy generation system associated with an energy storage device;

generating, via the processing circuitry, an ensemble of net load profiles based on the load profile and the power output of the energy generation system;

determining, via the processing circuitry, values of cumulative distribution functions associated with a plurality of energy storage device capacities as a function of at least the ensemble of net load profiles;

generating, via the processing circuitry, a graphical representation of a combination of the cumulative distribution functions and at least an equal probability line;

rendering the graphical representation; and sizing a capacity of the energy storage device based on the rendered graphical representation.

2. The method of claim 1, wherein the at least equal probability line is associated with a likelihood of satisfying a backfeeding energy limit.

3. The method of claim 1, wherein the step of determining the values of cumulative distribution functions includes
minimizing power backfeeding to a power grid, the energy storage device being associated with a local entity connected to the power grid.

4. The method of claim 3, wherein the local entity includes a demand-side management system associated with at least a consumer device.

5. The method of claim 1, further comprising:
determining an updated graphical representation based on the ensemble of net load profiles.

6. The method of claim 1, wherein the ensemble of net load profiles is based on the load profile and a solar profile associated with a location of the energy storage device.

7. The method of claim 1, wherein the energy storage device is associated with a home, a community, or a feeder.

8. The method of claim 1, further comprising:
providing, via processing circuitry of a server, the user interface on an external device; and
serving the graphical representation to the external device.

9. The method of claim 1, wherein the information includes lifestyle and behavioral data.

10. A system for sizing energy storage device capacity, comprising:
at least one consumer device;
a renewable energy generation system connected to an energy storage device; and
processing circuitry configured to
generate a load profile of the at least one consumer device based on at least information acquired by a user interface, the load profile including controllable loads and uncontrollable loads, and the controllable loads including temperature sensitive loads and behavior sensitive loads,
monitor for a predetermined time period the load profile of the at least one consumer device,
monitor for the predetermined time period a power output generated by the renewable energy generation system,
generate an ensemble of net load profiles based on the load profile and the power output of the energy generation system,
determine values of cumulative distribution functions associated with a plurality of energy storage device capacities as a function of at least the ensemble of net load profiles,
generate a graphical representation of a combination of the cumulative distribution functions and at least an equal probability line,
render the graphical representation, and
size a capacity of the energy storage device based on the rendered graphical representation.

11. The system of claim 10, wherein the at least equal probability line is associated with a likelihood of satisfying a backfeeding energy limit.

12. The system of claim 10, wherein the processing circuitry is further configured to:
minimize power backfeeding to a power grid, the energy storage device being associated with a local entity connected to the power grid.

13. The system of claim 12, wherein the local entity includes a demand-side management system associated with at least a consumer device.

14. The system of claim 10, wherein the information includes lifestyle and behavioral data.

15. The system of claim 10, wherein the ensemble of net load profiles is based on the load profile and a solar profile associated with a location of the energy storage device.

16. A non-transitory computer readable medium storing computer-readable instructions therein which when executed by a computer cause the computer to perform a method for sizing energy storage device capacity, the method comprising:
generating a load profile of at least one consumer device based on at least information acquired by a user interface, the load profile including controllable loads and uncontrollable loads, and the controllable loads including temperature sensitive loads and behavior sensitive loads;
monitoring for a predetermined time period the load profile;
monitoring for the predetermined time period a power output generated by an energy generation system associated with an energy storage device;
generating an ensemble of net load profiles based on the load profile and the power output of the energy generation system;
determining values of cumulative distribution functions associated with a plurality of energy storage device capacities as a function of at least the ensemble of net load profiles;
generating a graphical representation of a combination of the cumulative distribution functions and at least an equal probability line;
rendering the graphical representation; and
sizing a capacity of the energy storage device based on the rendered graphical representation.

* * * * *